(12) United States Patent
Kitlas et al.

(10) Patent No.: US 6,272,007 B1
(45) Date of Patent: Aug. 7, 2001

(54) COMPUTER SYSTEM COOLING CONFIGURATION

(75) Inventors: Kenneth Kitlas, San Jose; Anita Patel, Palo Alto; Satyanarayana Nishtala, Cupertino; Alan Lee Winick, San Jose; Alan Lam, Fremont; Winiie C. Leung, San Francisco; Kenneth A. Lown, Sunnyvale; Mohammed Tantoush, Union City, all of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/340,962

(22) Filed: Jun. 28, 1999

(51) Int. Cl.[7] .................................................. G06F 1/16
(52) U.S. Cl. ..................... 361/683; 361/724; 361/725; 312/216; 248/551
(58) Field of Search .................................. 361/683, 687, 361/727, 725, 726, 724, 684–686, 740, 759; 248/551–553; 312/216, 218; 70/57–58, 85

(56) References Cited

U.S. PATENT DOCUMENTS

| D. 425,879 | 5/2000 | Lee et al. ............................. D14/115 |
|---|---|---|
| D. 426,198 | 6/2000 | Lee et al. ............................. D14/102 |
| 4,964,017 | 10/1990 | Jindrick et al. ...................... 361/683 |
| 5,397,176 | 3/1995 | Allen et al. ....................... 312/223.1 |
| 5,447,367 | 9/1995 | Wei .................................... 361/683 |
| 5,513,068 | 4/1996 | Girard ................................ 361/685 |
| 5,542,757 | 8/1996 | Chang ............................... 312/223.1 |
| 5,547,272 | 8/1996 | Paterson et al. .................. 312/223.2 |
| 5,568,611 | 10/1996 | Khatri et al. ....................... 395/186 |
| 5,587,877 | * 12/1996 | Ryan et al. .......................... 361/683 |
| 5,884,988 | 3/1999 | Foo et al. .......................... 312/223.2 |
| 5,914,854 | * 6/1999 | Holt .................................... 361/683 |
| 6,055,152 | * 4/2000 | Felcman et al. ..................... 361/683 |
| 6,061,237 | * 5/2000 | Sands et al. ........................ 361/695 |
| 6,101,097 | * 8/2000 | Foo et al. ............................ 361/727 |

FOREIGN PATENT DOCUMENTS 2 255 674    11/1992   (GB) .

* cited by examiner

*Primary Examiner*—Leo P. Picard
*Assistant Examiner*—Hung Van Duong
(74) *Attorney, Agent, or Firm*—Conley, Rose & Tayon, PC; B. Noël Kivlin

(57) ABSTRACT

A computer system housing where a vertical printed circuit board, e.g., a riser card, is inserted into a socket on a computer system motherboard. Some internal space within the housing may allow optimization of system memory capacity through packing of additional memory modules on the riser card. The additional memory may be mounted on the riser card and may reside in the vertical space created between the riser card and the directly-mounted memory on the motherboard. The computer system housing further includes a chassis that may be partitioned into two separate sub-chassis for proper positioning of one or more cooling fans as well as to accommodate changes in computer system configurations with minimized retooling of the chassis. The cooling fans may be mounted at such locations on the chassis that allow optimization of air circulation and, hence, cooling within the housing. However, extra cooling fan(s) for the additional memory on the riser card may not be necessary in view of the creation of dedicated cooling channels within the housing by an efficient placement of the cooling fans. The optimization of fan placement within the housing results in efficient cooling of various system components and allows for increase in system component packing density without a similar increase in the number of cooling fans.

20 Claims, 13 Drawing Sheets

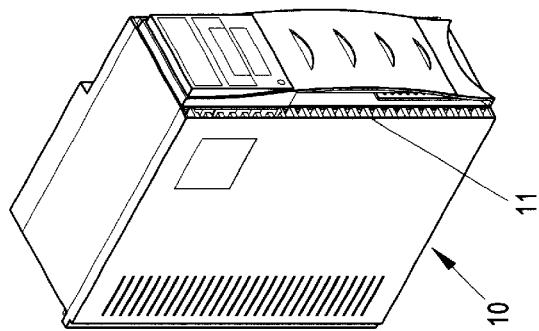
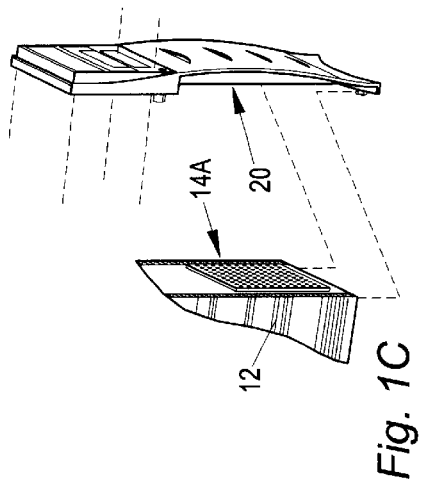
Fig. 1A
Fig. 1C
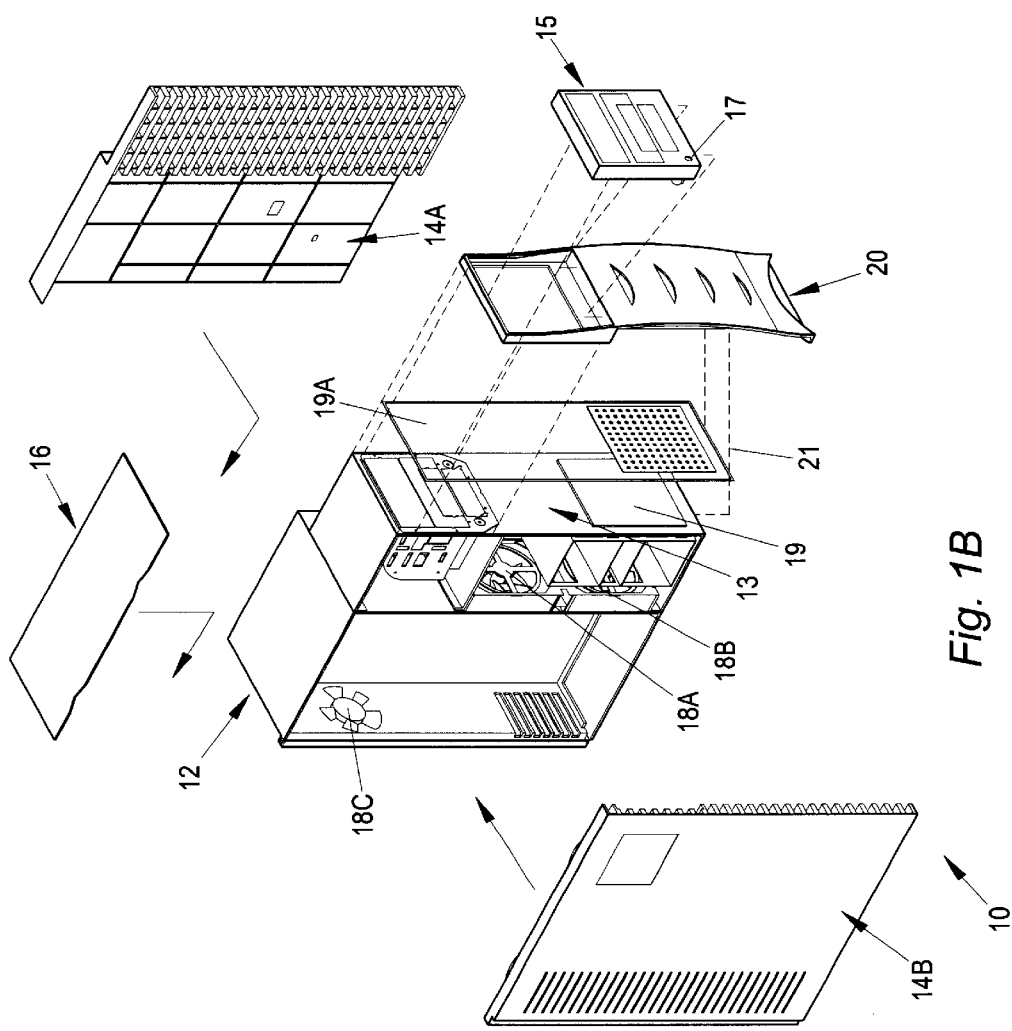
Fig. 1B

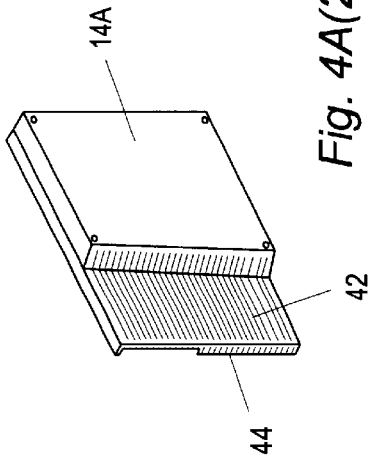
Fig. 4A(2)
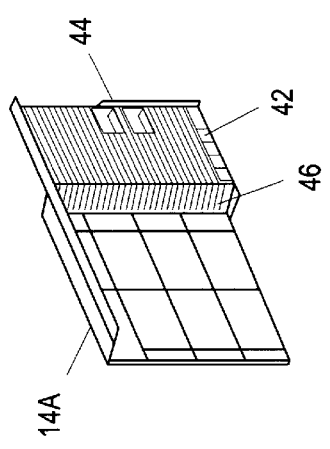
Fig. 4A(1)
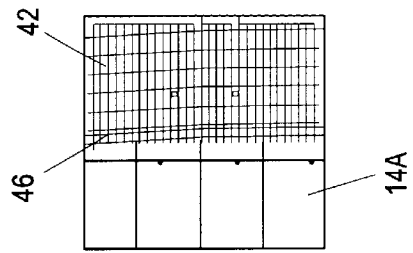
Fig. 4B(2)
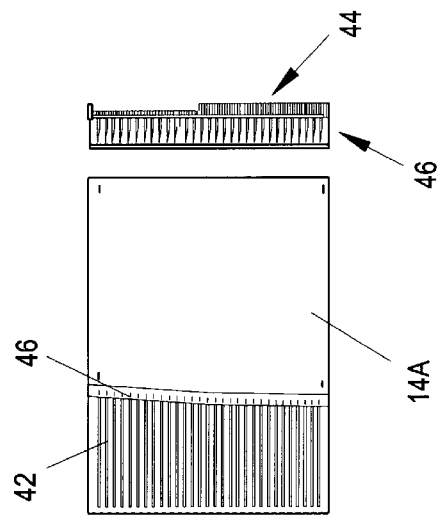
Fig. 4B(1)

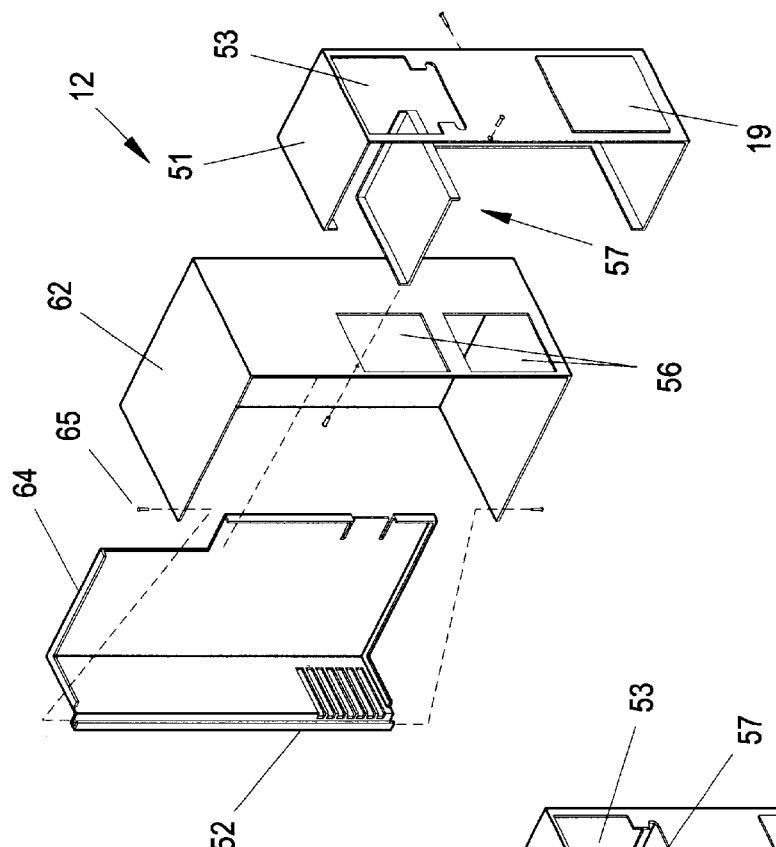
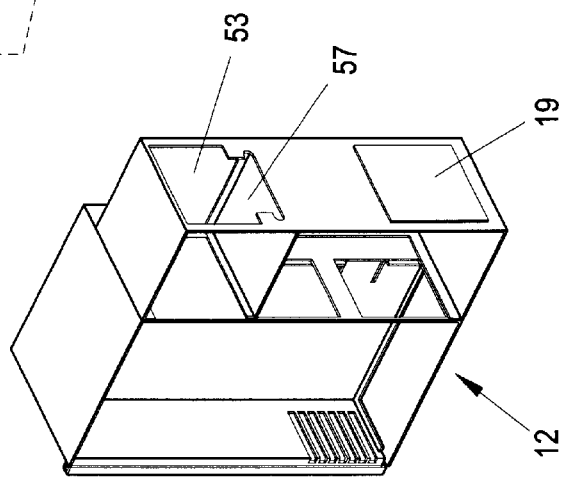
Fig. 5B
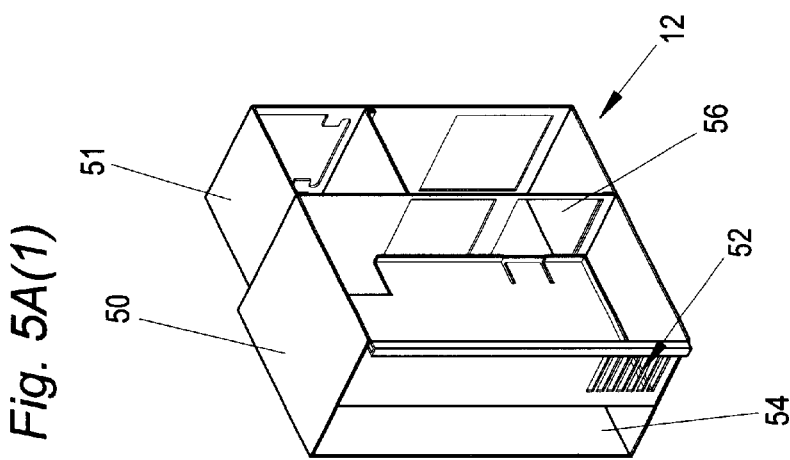
Fig. 5A(2)
Fig. 5A(1)

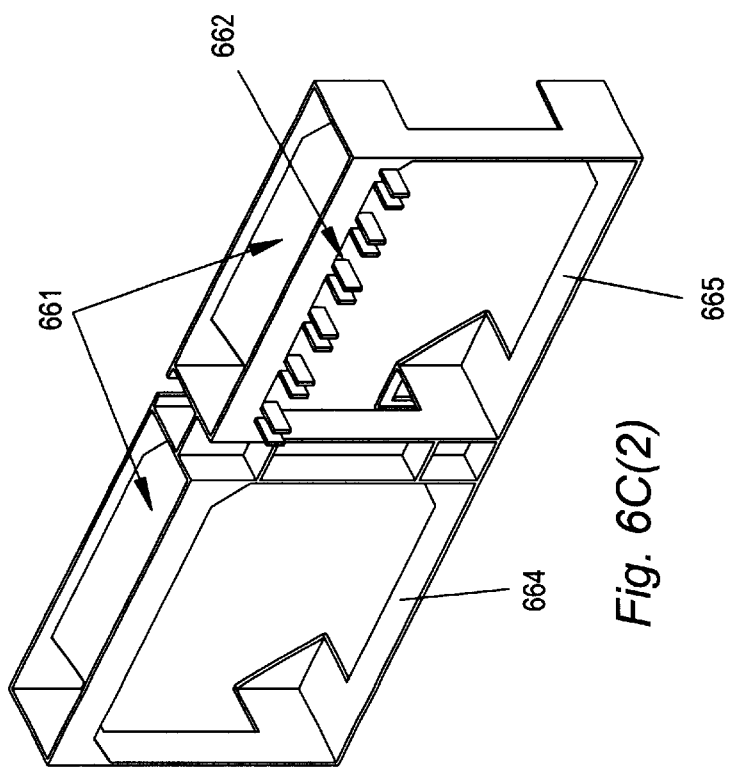
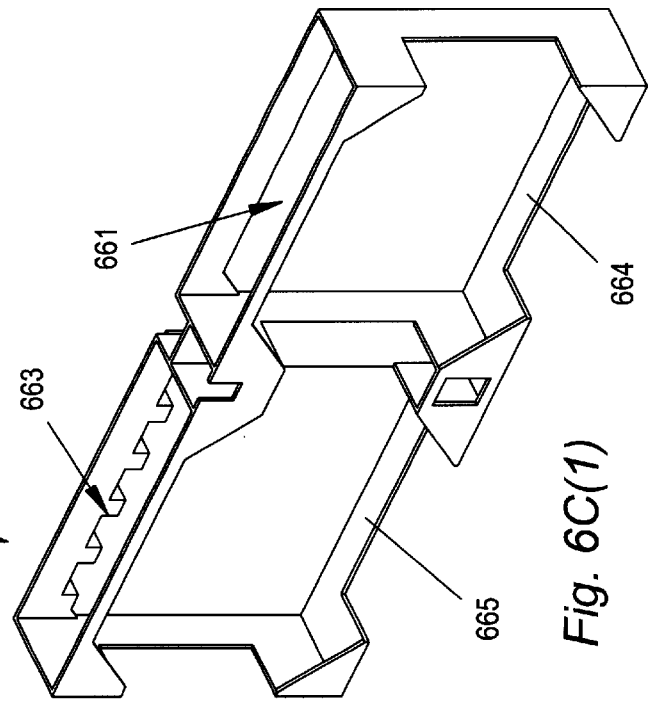
Fig. 6C(2)
Fig. 6C(1)

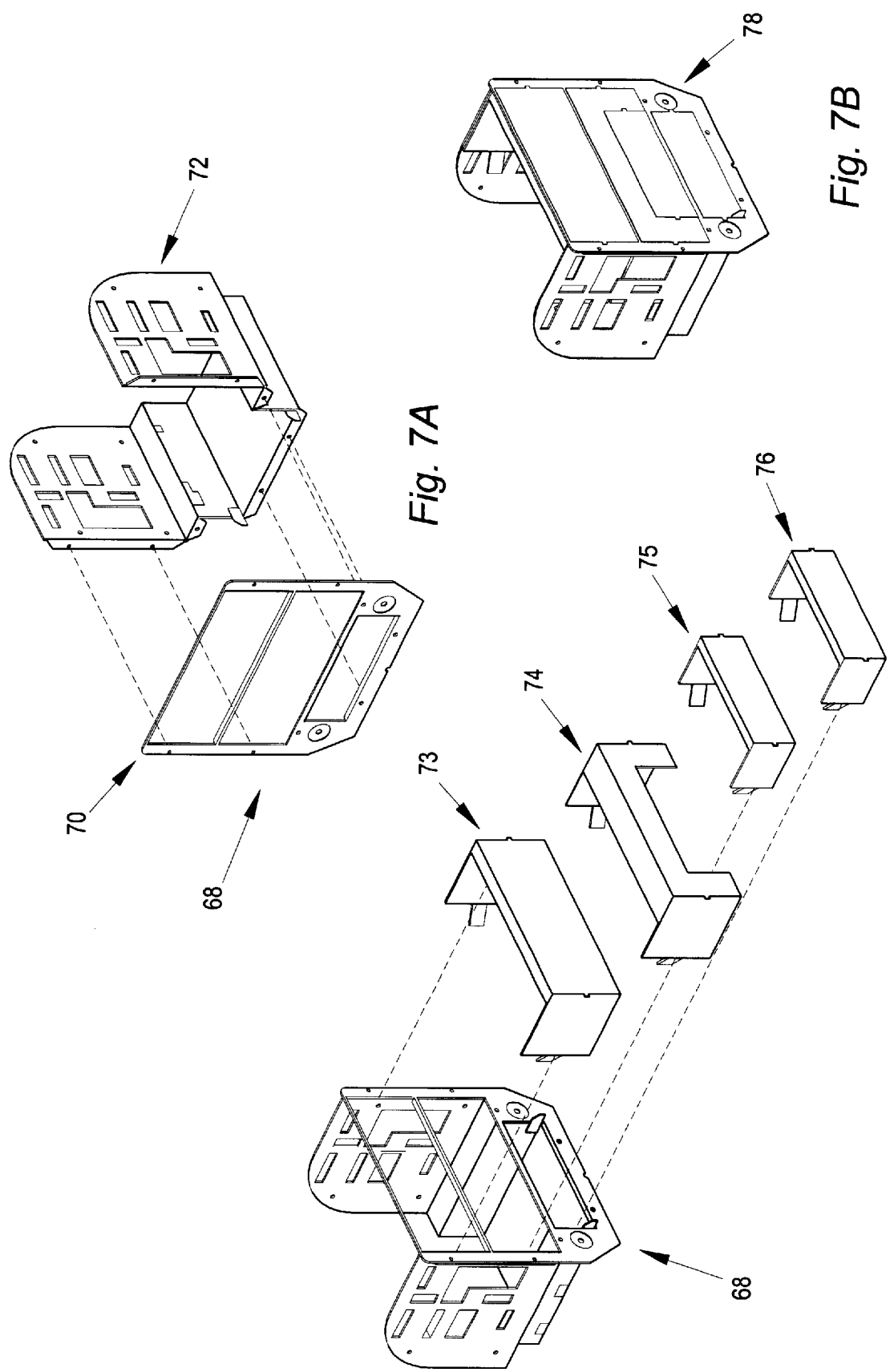

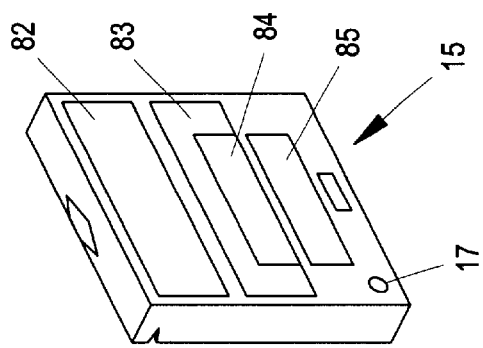
Fig. 8A(2)
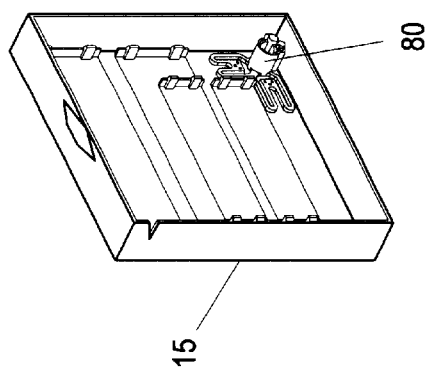
Fig. 8A(1)
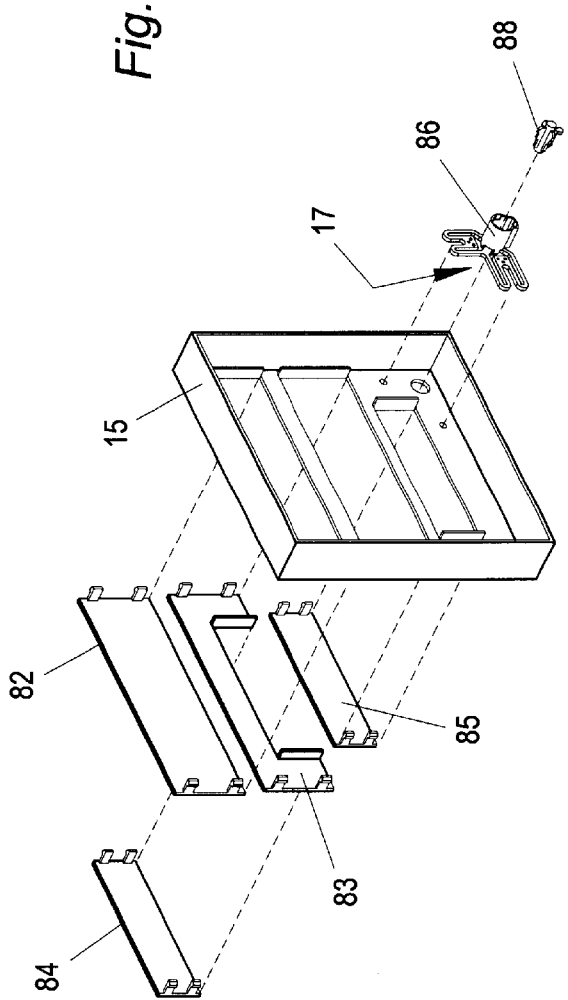
Fig. 8B

COMPUTER SYSTEM COOLING CONFIGURATION

BACKGROUND OF THE INVENTION

1. Field of the Invention

The present invention broadly relates to computer system configurations and housings, and more particularly to a computer system cooling configuration.

2. Description of the Related Art

Modern computer systems generally include a housing or an enclosure, a display device and an external command/ data input device. The display device may be a CRT (cathode ray tube) monitor, e.g., in a desktop computer system, or it could be a TFT (thin film transistor) screen, e.g., in a portable laptop computer. The external input device may be a keyboard, a pointing device, e.g., a mouse, or a combination of them. The system housing is an enclosure that houses the hardware components that perform, along with necessary software, various processing tasks as requested by the user. The housing may also include one or more power supplies to supply proper electrical power to various electronic hardware circuit elements. Auxiliary storage device drives, e.g., a floppy disk drive or a CD-ROM drive may also be housed within the computer system housing. Additionally, hard disk drive for large amount of data storage is almost invariably included within the computer housing for greater digital information storage capacity.

Electronic components or hardware circuit elements include semiconductor devices. During operation, such electronic components dissipate electrical power (i.e., transform electrical energy into heat energy). At the same time, several key operating parameters of semiconductor electronic devices typically vary with temperature, and reliable device operation within specifications occurs only within a defined operating temperature range. For example, specified performance of a processor is typically achieved only when the temperature of the processing device or "processor", e.g., one or more microprocessors, is maintained below a specified maximum operating temperature. Operation of the processor at a temperature above the maximum operating temperature may result in irreversible damage to the processor. In addition, it has been established that the reliabilities of semiconductor electronic devices decrease with increasing operating temperature.

The heat energy produced by electronic components during operation must thus be removed to a surrounding ambient at a rate which ensures that operational and reliability requirements are met. As component speeds, capabilities and density increase, so does the amount of electrical power dissipated by the components during operation. Cooling mechanisms employed by computer systems must thus allow for more guided airflow into the housing for faster heat transfer from the computer system enclosure to the surrounding ambient.

Today, a typical computer system includes various openings or vents on one or more of the side panels for the housing and/or sometimes on the front bezel itself. The front bezel generally includes power and reset buttons for the system and typically includes areas to allow a user to load CDs and/or floppy disks into corresponding disk drives. The various openings or vents, in conjunction with one or more fans mounted on a metal chassis or included within an appropriate hardware unit, e.g., the power supply unit, allow ambient air to flow into the computer system housing and over the electronic hardware components within the housing, absorbing heat energy from the components before being expelled through the openings or vents in the rear of the metal chassis.

In some computer systems, an independent fan is attached to a heat sink mounted to the processor. However, as the number of processors within the system increases, additional fans or cooling mechanisms are needed to efficiently expel the heat generated by these processors. Fans are rotating electromechanical devices which produce acoustic noise and fail relatively often (i.e., have relatively short operating life). When a fan fails, the components that rely on the cooling air provided by the fan can, and often do, fail as well. Further, fans are relatively heavier in weight, and increasing the number of fans may increase the weight of the computer system housing. Therefore, a computer system housing where adequate component cooling is achieved without undue multiplicity of cooling fans may be desirable.

The power supply unit normally produces more heat energy than most of the other electronic components. It may also be desirable to have a computer system chassis that keeps the power supply unit and its cooling system physically separated from the rest of the system hardware mounted on the chassis so as to reduce heat dissipation around the rest of the system hardware.

The enclosure for computer system components has a limited volume. The expandability of system processing power or system storage capacity, e.g., on-board caches and RAMs (Random Access Memory), depends, among other factors, on the size or volume of the computer system housing. Further, increase in the number of electronic components that are housed within the enclosure may necessitate proportionate availability of adequate cooling means for reliable operation of the computer system. Therefore, it may be desirable to optimize the component packing density within the housing while maintaining proper airflow through the computer system components for adequate cooling.

SUMMARY OF THE INVENTION

The problems outlined above may in large part be solved by a computer system housing where the memory capacity of the computer system is increased through efficient utilization of the computer system housing space. A first plurality of memory cards are inserted on a printed circuit board, generally the motherboard. A memory riser board or a vertical printed circuit board may then be inserted onto the motherboard and in parallel to the first plurality of memory cards. The riser board may carry a second plurality of memory cards that is oriented in vertical direction and at right angle to the first plurality of memory cards. The second plurality of memory cards thus occupies the vertical space between the riser card and the memory card on the motherboard that is closest to the riser card. The vertical space within the computer housing may thus be efficiently utilized without necessitating additional cooling for the memories on the riser board.

The housing includes a metal chassis that provides a frame or structure to mount a number of computer system components on. In one embodiment, the metal chassis may be partitioned into two separate sub-chassis: the front sub-chassis and the rear sub-chassis. The partitioning of the system chassis may allow for flexible manufacturing of different configurations of the computer system, for example, when the requirements for computer system component packing density or for the size of the power supply unit are variable. Due to the separate tooling of the two sub-chassis, only one of the sub-chassis may be retooled in view of the changed configuration requirements.

The fans mounted at different locations on the metal chassis may draw air from the air inlets in the housing and cool appropriate hardware components before expelling the heat-containing air to the surrounding ambient through one or more vents provided on the rear side of the chassis. In one embodiment, one or more cooling fans may be mounted on the chassis without screws. Fans may be configured to snap into a corresponding bracket, and the bracket may be configured to snap into the chassis without requiring any screws.

In one particular embodiment, dedicated channels of cooling air are created by efficient placement of cooling fans at various locations on the chassis. Two larger cooling fans may be mounted at the junction of the two sub-chassis to maintain two air channels within the housing. These two air channels effectively cover a substantial portion of the interior of the housing. A relatively smaller cooling fan may be mounted at the rear end of the rear sub-chassis to effectuate cooling of the extreme top portion of the housing, which includes the additional memory on the riser card. In one embodiment, the cooling of the power supply unit within the housing is managed independently of the cooling of the remainder of the computer system. Two smaller cooling fans may be dedicated to cool the power supply unit. The optimization of fan placement within the housing results in efficient cooling of various system components and allows for increase in system component packing density without a similar increase in the number of cooling fans.

BRIEF DESCRIPTION OF THE DRAWINGS

A better understanding of the present invention can be obtained when the following detailed description of the preferred embodiment is considered in conjunction with the following drawings, in which:

FIG. 1A shows a computer system housing having a sideways airflow gap in the front of the housing.

FIG. 1B depicts a disassembled view of the housing in FIG. 1A.

FIG. 1C highlights the curved bezel portion of the housing in FIG. 1A.

FIGS. 4A–4B depict structural details of the right access panel shown in FIG. 1B.

FIGS. 5A–5B illustrate partitioning of the chassis for the computer system housing.

FIG. 6C depicts two three-dimensional views of the cooling fan bracket shown in FIGS. 6A and 6B.

FIG. 7A is a three-dimensional view of the storage chamber (without fillers) in FIGS. 6A–6B. The access panel and the bracket are shown disassembled.

FIG. 7B depicts a peripheral assembly with various fillers attached to the storage chamber shown in FIGS. 6A–6B and 7A.

FIG. 8A illustrates internal and external views of a power button assembly mounted on a peripheral bezel.

FIG. 8B is a disassembled view of the peripheral bezel in FIG. 8A.

DETAILED DESCRIPTION OF THE PREFERRED EMBODIMENT

Figures 2A, 2B:
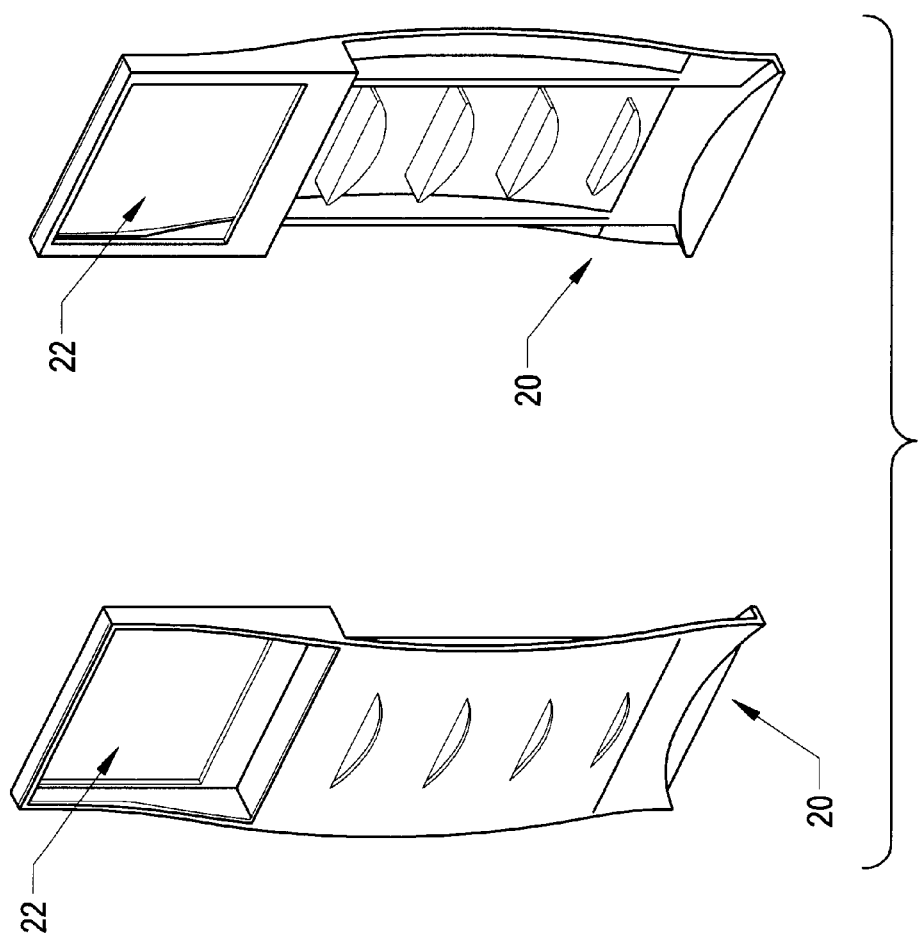
FIGS. 2A and 2B further depict various views of the curved bezel in FIGS. 1A–1C.

Referring now to FIG. 1A, a computer system housing 10 is shown with a sideways airflow gap or air inlet 11 in the front of the housing. FIG. 1B illustrates a disassembled view of the housing 10. The housing 10 includes a metal chassis 12 that may be covered by a number of plastic access panels or enclosures. For example, the panel 16 may be securely placed at the top of the chassis 12, whereas access panels 14A,14B may be mounted on the chassis 12 to cover the left side and the right side of the chassis 12 respectively. A plastic bezel 20 may also be placed at the front 13 of the chassis as is illustrated in FIG. 1B. The bezel and various access panels provide an enclosure for the computer system components mounted on the chassis 12.

A number of computer system components, e.g., motherboard, I/O cards, disk drives, cooling fans, hard drives, etc., may be mounted on the metal chassis 12. A cooling fan 18A for processing units (or processors), a cooling fan 18B for the PCI (Peripheral Component Interconnect) bus and PCI cards and a cooling fan 18C for memory cards are shown mounted on the chassis 12 at appropriate locations. A detailed description of the complete cooling arrangement for the housing 10 is given later.

The sideways air inlet 11 (FIG. 1A) is formed when the bezel 20 is attached to the front of the chassis 12. In the preferred embodiment, the bezel 20 forms sideways airflow gaps 11 on both sides (left side and right side) of the front 13 of the chassis. Each sideways airflow gap extends perpendicularly from the front of the chassis to a predetermined width, which is decided by the curvature of the bezel 20 placed over the chassis front. For example, the bezel 20 in FIG. 1B (shown in detail in FIG. 2A) has a curvature over almost the entire length of the bezel. Therefore, in such a situation, the sideways airflow gaps may be continuous over the entire length of the bezel 20, albeit of varying width. Each sideways air inlet 11 also extends to a predetermined length along the front of the chassis. Similar to the width of the sideways airflow gaps, the lengths of sideways air inlets depend on the shape of the bezel 20 and on the length of the bezel.

A plastic peripheral bezel 15 with a power button 17 may be configured to be snapped into the bezel 20 as shown in FIG. 1B. In one embodiment, a chassis cover 19A is placed between the front of the chassis and the curved bezel 20. The chassis cover 19A is normally hollow except for a small net 21 provided at the bottom of the chassis cover. The net 21 may comprise a large number of circular openings that prevent unwanted foreign objects or insects to enter into the hard drive opening 19 in the front wall of the chassis. The net 21 may be necessary in view of the large sideways air gaps created through the curved bezel 20, and also in view of the strong air currents generated by the cooling fans 18A–18C. The holes in the net 21 may be rectangular, square, hexagonal, or a combination of a number of shapes as desired. The chassis cover 19A may be of metal, plastic or any suitable material.

In an alternative embodiment, the chassis cover 19A is absent, but, instead, a substantial portion of the front wall 13 of the chassis 12 is netted with holes similar to that in the chassis cover 19A. Only the top portion of the front of the chassis that houses peripheral drives contains no holes or net therein, but, instead, provides the regular opening for the drives as is shown in FIG. 1B. The size, shape and placement of the net-like structure may thus be design-dependent.

FIG. 1C emphasizes the curved bezel portion of the housing 10. The curvature of the bezel 20 is clearly visible in FIG. 1C. The bezel 20 is preferably made of plastic and is securely fastened to the chassis 12 with molded-in hooks and screws (as partially illustrated in FIGS. 1B and 1C). In one embodiment, the bezel 20 is attached to the front of the chassis 12 using four sliding molded-in hooks and two screws without removing peripheral drives or other access panels (e.g., panels 14A and 14B). The bezel 20 may similarly be removed from the chassis without removing the peripheral devices that are already mounted on the chassis.

It is to be noted that the term "front" as used herein refers to that side of the housing 10 which is generally accessed by a user (e.g., for turning on/off the computer system) when the housing 10 is placed in an upright position over a surface. Furthermore, the sideways air inlet 11 may also be formed along another wall of the chassis 12 in addition to or in lieu of the front wall 13 of the chassis illustrated in FIGS. 1A–1C. The location of sideways air inlet 11 may depend on the specific design considerations, e.g., placement of cooling fans, placement of circuit components to be cooled, orientation of the housing during regular usage, etc.

FIGS. 2A and 2B show some additional views of the curved bezel 20. The bezel 20 contains an opening 22 through which the peripheral bezel 15 may be snapped into. Due to the snap-in feature of the peripheral bezel 15, the shape and size of the bezel 20 may be changed without requiring a similar change in the peripheral bezel 15 design. The peripheral bezel 15 design may therefore be made independent of the design of the bezel 20. The removal of the bezel 20 may similarly remove the attached peripheral bezel 15, but without removing any peripheral devices or access panels as discussed earlier. The curvature of the bezel surface is clearly visible in the views shown in FIGS. 2A–2B.

In one embodiment, the bezel 20 has no other opening along its surface except for the opening 22. This allows for substantial reduction in audible emissions transmitted in a "line of sight" direction to a user when the housing 10 is placed near the user with the bezel facing the user. These audible emissions may be transmitted from the electronic or electromechanical components mounted along the front side of the chassis 12. Examples of such components may include hard disk drives, CD ROM drive, floppy disk drive, a cooling fan etc. An acoustic foam may also be placed along the inside border of the bezel 20 and also over those parts of the bezel's inside surface that are in front of the noise sources, e.g., near the opening 19 and near the opening 22. The bezel 20 may then be securely fastened to the chassis 12 with hooks and screws as described earlier.

In an alternative embodiment, the curved shape of the bezel 20 creates sideways (i.e., on the left side and on the right side of the housing 10) air inlets 11 that expose around 60% of the front of the chassis to the ambient air. Such an arrangement results in increased cooling air supply for the cooling fans, without increasing the audible emissions (described above) that may be transmitted to the user. Further, the curved shape of the bezel 20 may provide easy grasping through the sideways air gaps when the housing 10 is moved from one location to another or during a casual positioning of the housing 10. For short distance or casual handling of the housing 10, a finger grip may be provided at the bottom front of the bezel 20. In one embodiment, the weight of the entire housing 10 that may be ready for shipping is around 60 lbs. The bezel 20 may be designed of plastic of appropriate thickness so as to provide firm and secure grip (through hook and screw attachment and through the bezel curvature) during transportation or handling of the complete housing weighing around 60 lbs.

Figure 3B:
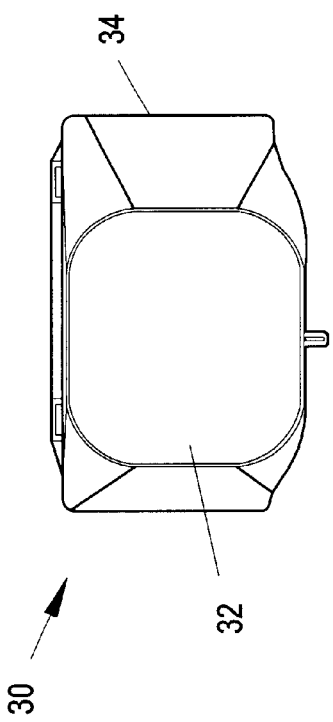
FIGS. 3A–3C show different views of an air guide that may be mounted on a cooling fan to optimize channeling of the cooling air to the desired system components.
Figure 3C:
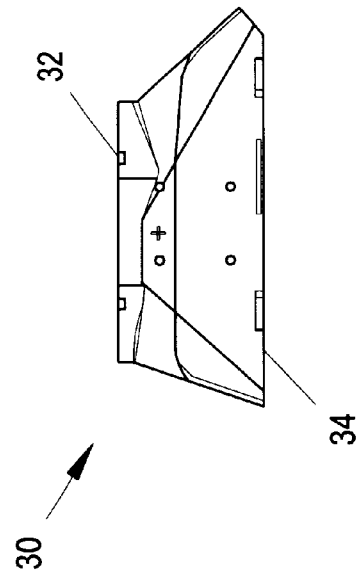
Figure 3A:
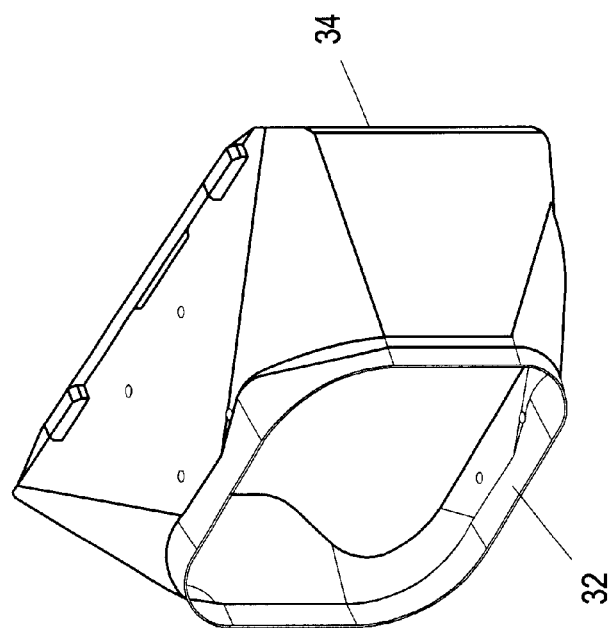

Turning now to FIGS. 3A–3C, different views of a plastic air guide 30 that may be mounted on a cooling fan (e.g., fan 18A or 18B in FIG. 1B) to optimize channeling of the cooling air to the desired system components are shown. The air guide 20 is formed of a narrow neck portion 32 and a wide and elongated mouth portion 34. The shape of the air guide 30 facilitates focussed channeling of the airflow coming from the corresponding cooling fan the air guide is attached to. More than one air guide may be provided in the housing 10 to efficiently direct the airflow to the electronic components to be cooled, e.g., the processors (cooled by the fan 18A) or the PCI cards (cooled by the fan 18B). The air guide 30 may distribute the cooling air evenly over the entire surface carrying the electronic components to be cooled. The air guide 30 may be snapped onto the corresponding cooling fan bracket without requiring any tools or fixtures to mount the air guide. A further discussion of cooling with the help of air guides is provided later with reference to FIG. 12.

As mentioned earlier, the side access panels 14A, 14B are mounted on the chassis 12 to provide enclosure for the components within the housing. These side access panels 14A,14B, and the top access panel 16 may generally be made of the same plastic as the front bezel 20. Any other suitable material may be used to manufacture access panels of desired strength and physical appearance. As described before, the sideways air inlets 11 formed by the curved bezel 20 expose a large portion of the front 13 of the chassis to the ambient air. The surrounding air entering into the housing through the air inlets 11 may be directed with the help of a number of cooling fans 18A–18C to appropriate computer system components to be cooled. Additional channeling and containment of the air inside the housing may be provided through the interior surfaces of the side access panels 14A and 14B.

Referring now to FIGS. 4A and 4B, some structural details of the right access panel 14A (FIG. 1B) are shown. The access panel 14A may have corrugations 44 of varying length along the edge that is closer to the bezel 20 as shown in FIG. 1A. The width of each corrugation may not be identical. The corrugations may form a strip 44 along the "front" edge of the access panel 14A as clearly shown in FIG. 4A. The strip of corrugations may be formed at right angle to the edge, as shown. Alternately, the strip may form any suitable angle with the edge of the access panel 14A so long as the strip does not block the adjacent sideways air inlet 11. The strip of corrugations may be formed as part of a single mold for the entire access panel 14A. Alternately, the strip may be attached to the corresponding edge of the access panel through suitable fasteners, e.g., screws, nuts and bolts, or the strip may be made to snap into the corresponding edge. The strip of corrugations may further prevent foreign objects or insects from entering into the housing via the corresponding sideways air inlet. Additionally, the strip 44 may protect a user from directly accessing sharp metal surface of the chassis 12 when the user tries to grasp the front bezel 20 through the air inlet 11.

The right access panel 14A may further include a number of protrusions 42 along a portion of its internal surface. The protrusions 42 may taper off at a suitable angle to the internal surface of the access panel 14A, thereby forming the channel ends 46. The length, width and depth of the protrusions may depend on the designer. The protrusions 42 form channels for passage of airflow. The inside surface of the access panel 14A may be made smooth so that the air entering into the housing via the sideways air inlets 11 may move rapidly over the access panel. Faster air movement may result in rapid circulation of air within the housing, and may result in faster cooling of the desired system components. The left view in FIG. 4B is a front view of the right image in FIG. 4A, whereas the right view in FIG. 4B is a partial front view of the left image in FIG. 4A. The central view in FIG. 4B depicts left hand side view of the left image in FIG. 4A.

The left access panel 14B may be constructed similar to the right access panel 14A. In one embodiment, the left access panel 14B includes the strip of corrugations, but does not have any protrusions 42 similar to the right access panel 14A. Further, the left access panel 14B may not have an indented portion (for the power supply unit) similar to that shown for the right access panel 14A. The orientation of the strip 44 in the left access panel 14B may be at a different angle to the panel edge than that of the strip in the right access panel 14A. All of the access panels 14A, 14B and 16, may be snugly snapped into the corresponding chassis walls. Alternately, the access panels may be mounted on the corresponding chassis walls using fasteners, e.g., screws, nuts and bolts, etc.

It is noted that efficient cooling within a computer system housing generally depends on two factors: (1) The overall design of the housing, which includes placement of cooling fans and channeling of ambient air flow through various parts of the housing; and (2) The density of the components packed within the housing, which depends on the projected air flow within the housing and the type and nature of the component that requires cooling. For example, processors or processing units may require sustained cooling for efficient performance, whereas a memory card may not require similar level of cooling. Therefore, processors and memory cards within the housing may be placed at different locations in the path of the projected air flow within the housing.

The overall design of the housing also includes shape and structure of the underlying chassis. A flexible chassis design may be desirable to minimize expenses involved in retooling of a new chassis in the event of a changed configuration for one or more of the computer system component. For example, current computer systems typically utilize a single tooled main chassis. The "Ultra 30" chassis design is one example of this structure. Under the single tooled chassis design, an improvement or modification in a component design (e.g., larger power supply unit or addition of peripheral bays) may require complete retooling of the entire chassis design.

The foregoing problem is eliminated through a compartmentalized chassis design that is illustrated in FIGS. 5A and 5B. The chassis 12 for the housing 10 is shown partitioned into two main units: a front sub-chassis 51, and a rear sub-chassis 50. Each of these units may be retooled independent of the other unit. Therefore, a changed system configuration may not necessitate retooling of the entire chassis. Instead, one sub-chassis may be reused and only the other sub-chassis may be retooled.

Figure 6B:
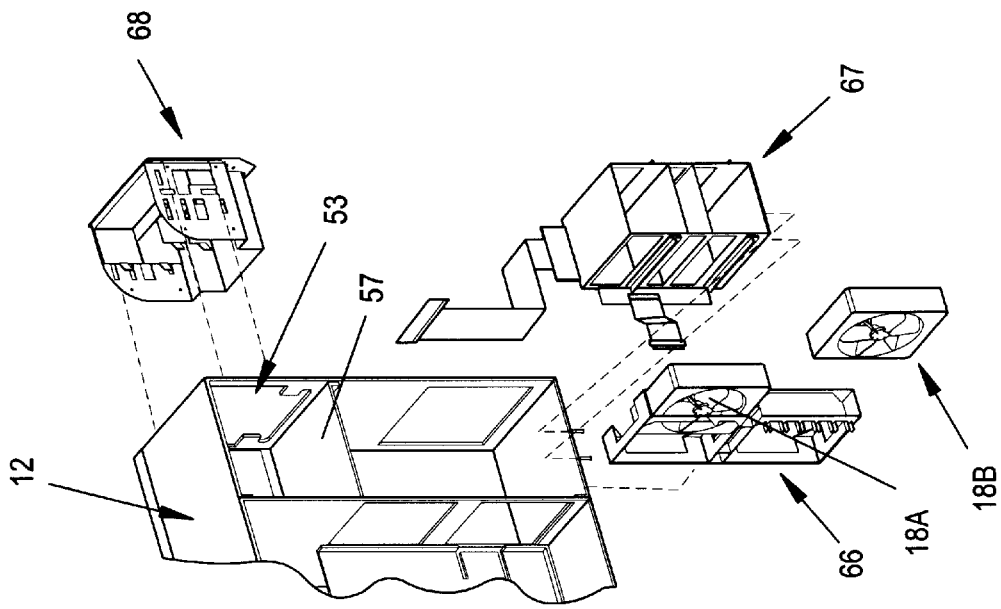
FIG. 6B shows in a disassembled form the computer system components shown mounted on the chassis in FIG. 6A.
Figure 6A:
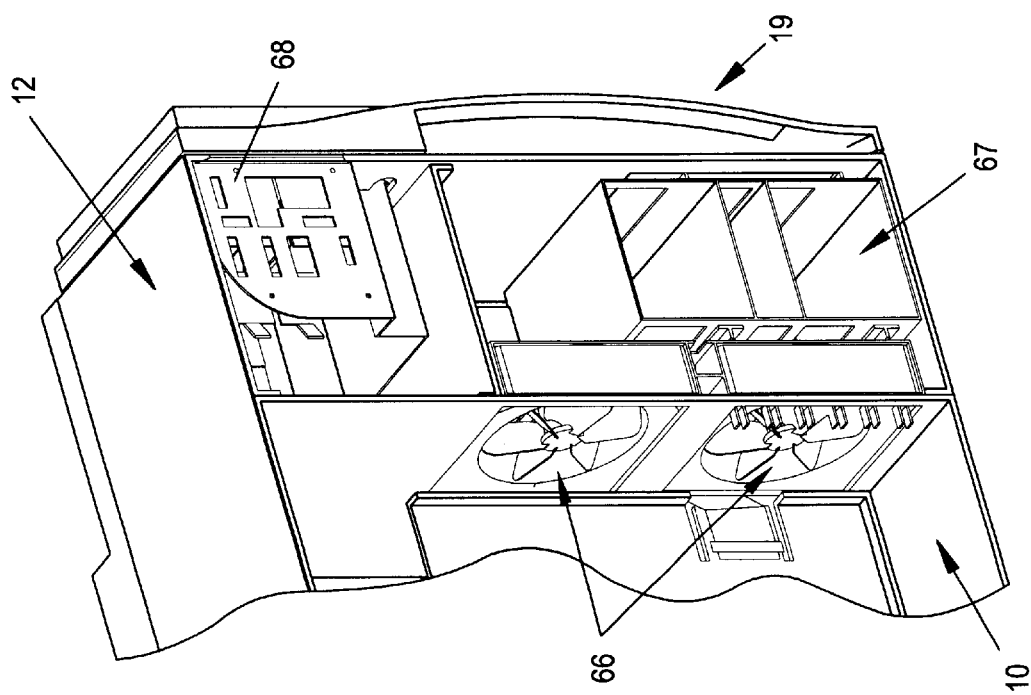
FIG. 6A shows a cut-out view of the computer system housing with the chassis having a peripheral bay unit (without fillers) mounted thereon.

The front sub-chassis includes a first opening 53 for a storage chamber or a peripheral bay unit 68 (FIG. 6B). The second opening 19 allows ambient air to enter into the housing 10 through the hard drive cage 67 (FIG. 6A). A metallic peripheral shelf 57 may extend from the front sub-chassis 51 to the rear sub-chassis 50 as is illustrated in FIGS. 5A, 5B. The peripheral bay unit 68 may be placed over the peripheral shelf 57 (FIGS. 6A, 6B), which provides support for the weight of the peripheral drives as well as containment of any electromagnetic interference (EMI) generated in the vicinity of the peripheral shelf 57, for example, by the peripheral drives inside the peripheral bay unit 68 and/or by one or more hard disk drives inside the hard drive cage 67. The rear sub-chassis 50 may include two openings 56 to mount the cooling fan bracket 66 (FIGS. 6A and 6B). The openings 56 may be provided at the junction of the front and the rear sub-chassis, as is shown in FIG. 5A. The cooling fans, therefore, may remain at a distance from the front 13 of the chassis 12 when mounted inside the openings 56. This may reduce transmission of audible emissions (from the cooling fans in operation) to a user sitting adjacent to the front of the chassis.

The back side of the rear sub-chassis 50 may include a predetermined number of openings 52 for I/O ports or connectors, and a power supply window 54 to receive an external system power supply 118 (FIG. 12A) for the entire computer housing 10. FIG. 5B illustrates a disassembled view of the front and the rear sub-chassis. The rear sub-chassis 50 may comprise two portions: the front portion 62 and the back portion 64. The front portion 62 gets attached to the front sub-chassis 51 as is illustrated in FIG. 5B. Whereas, the back portion 64 is slid inside the front portion 62 and fastened to the front portion 62 with the help of a number of rivets 65. Additional fastening of the front and the rear portions of the rear sub-chassis 50 may be provided through various extruded features within those portions and also with the help of additional fasteners, e.g., rivets, screws, nuts and bolts, toggle-lock features etc. The front sub-chassis 51 and the rear sub-chassis 50 may also be similarly fastened with each other.

Figure 12A:
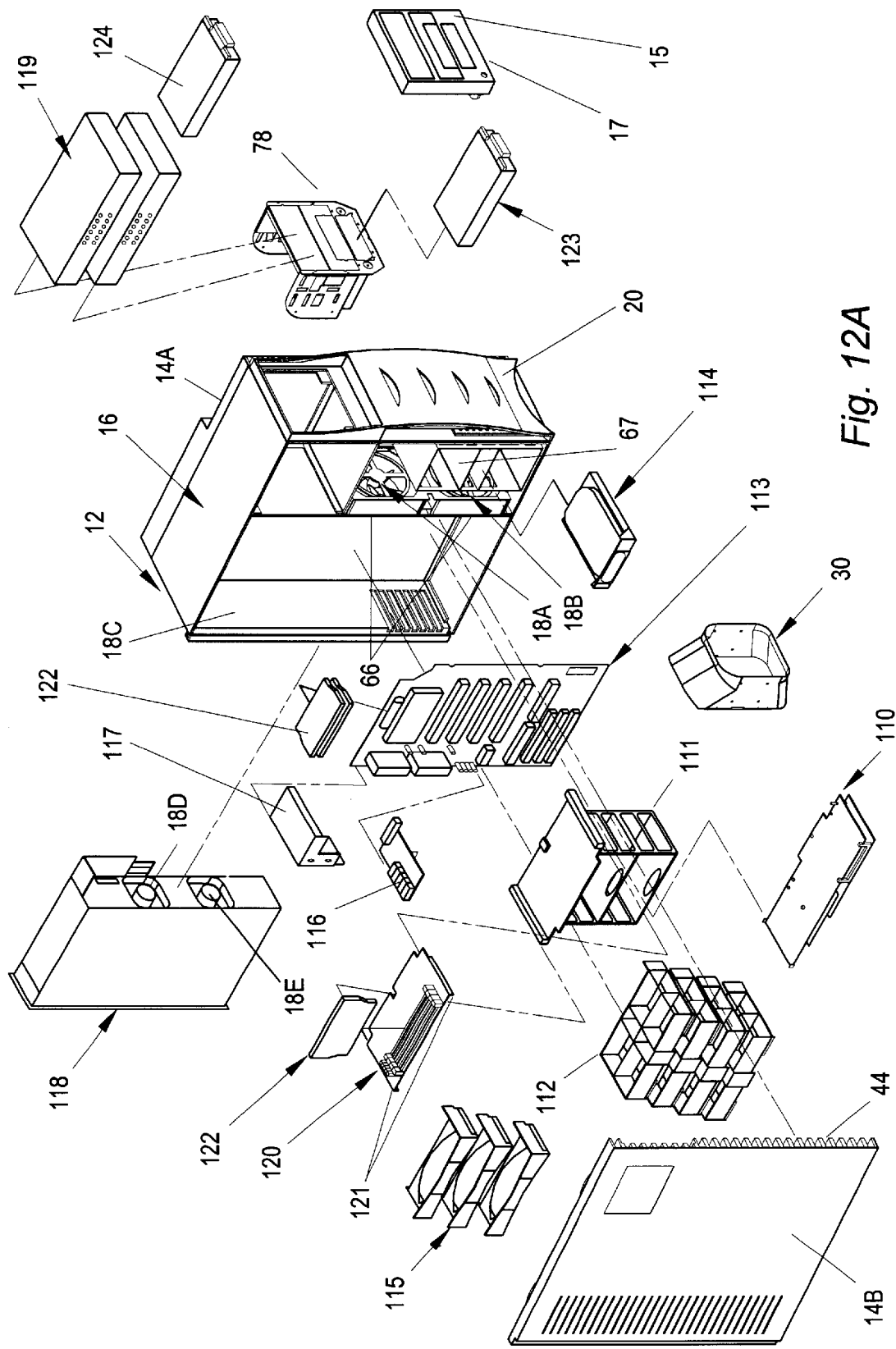
FIG. 12A is a disassembled view of the computer system housing showing locations and placement of various system components.

The power supply window 54 is created when the rear portion 64 of the rear sub-chassis 50 is attached to the front portion 62 of the rear sub-chassis 50. Due to the confining of the system power supply into a separate, closed chamber, the audible noise emissions from the system power supply may be reduced. Further, the shielding of other electronic components within the housing 10 from the effects of electromagnetic interference from the high-voltage power supply circuitry may effectively be reduced. Additionally, the compartmentalization approach illustrated through FIGS. 5A and 5B may facilitate easy removal and servicing of the system power supply, because an electromechanical component within the high-voltage power supply unit 118 (FIG. 12A) may fail faster than the low power consuming electronic circuitry on a motherboard 113 (FIG. 12A). Above all, the cooling within the housing improves when the power supply is cooled independently of the other electronic components (e.g., fans 18D and 18E in FIG. 12A). The cooling fans mounted in the openings 56 may not need to expend additional energy to cool the bulky power supply unit. Instead, a dedicated and focussed cooling of various electronic components may be accomplished as discussed later with reference to FIG. 12B.

Referring now to FIG. 6A, a three-dimensional cut-out view of the computer system housing 10 is shown. Various computer system components, such as the peripheral bay unit or the peripheral drive storage chamber 68, the hard disk drive cage 67, the cooling fan bracket 66, etc. are shown mounted on the chassis. The storage chamber 68 houses one or more storage drives, e.g., the CD ROM (Read Only Memory) drive, the floppy disk drive, etc. The storage chamber is normally made of metal or components having similar strength to support the weight of the storage drives. The hard disk drive cage 67 may house one or more hard disk drives (not shown), and, preferably, may also include a SCSI (Small Computer System Interface) circuitry (not shown) for interfacing the hard disk drive to one or more processors (not shown) housed within the housing 10. The hard disk drive typically provides non-volatile auxiliary memory storage that is in addition to that provided by the system memory. The cooling fan bracket 66 may house one or more cooling fans (18A and/or 18B) to provide cooling for the heat generated by various electronic parts when the computer system is powered on.

Turning now to FIG. 6B, the computer system components shown mounted on the chassis 12 in FIG. 6A are shown in a disassembled view. The peripheral bay unit 68 may be inserted through the opening 53 in the front sub-chassis 51, whereas the hard disk drive cage 67 and the cooling fan bracket 66 may be mounted on the front sub-chassis 51 from one of the sides as illustrated. The peripheral bay unit 68 may be securely fastened on/over the peripheral shelf 57, whereas the hard drive cage 67 may be fastened to the bottom of the front sub-chassis 51. Fasteners, such as adhesive tapes, rivets, screws, nuts and bolts, etc., may be used to securely mount these components on appropriate surfaces. The mounting of the cooling fan bracket 66 and of each cooling fan is described below with reference to FIG. 6C.

FIG. 6C depicts two views of the cooling fan bracket 66. The fan bracket 66 is preferably a plastic structure that may house a maximum of two fans. The fan bracket 66 is formed of two halves: the top half 664 and the bottom half 665. The reference to the terms "top" and "bottom" here is in view of the actual installation of the bracket 66 as shown in FIGS. 6A and 6B. Each half of the fan bracket 66 may be individually manufactured and later joined with the other half through suitable fastener (including adhesive tapes) or snapped into the other half. Preferably, the whole fan bracket 66 (including both of the halves) may be manufactured through a single mold. Each half of the fan bracket 66 has a fan entrance 661 through which a respective fan, 18A or 18B, may be snapped into.

The entire bracket 66 snaps into the chassis frame at the junction of the front sub-chassis 51 and the rear sub-chassis 50 (FIG. 5A). The bracket 66 in FIG. 6C is first turned in a vertical position and then inserted into the front sub-chassis 51 with the fan openings in the bracket 66 aligned with the openings 56 (FIG. 5A) in the rear sub-chassis 50. The bracket 66 is then snapped into the chassis 12 at the junction of the front and the rear sub-chassis as shown in the assembled view in FIG. 6A. Each fan, 18A and 18B, also snaps into the bracket 66 once the bracket is mounted on the chassis. Alternately, each fan may first be mounted on the bracket 66, and the complete assembly may then be snapped into the chassis. In one embodiment, each cooling fan 18A, 18B is of 120 mm size. Each fan may be either a standard fan or a Japan Servo type fan. At the time of servicing, either fan (18A or 18B) may be individually removed and replaced without removing the entire bracket 66 or without removing the other fan. Thus, the bracket design allows mounting of two cooling fans without screws.

The bracket 66 also includes PCI card guides 662 (protruding from the bottom half 665 of the bracket) for long PCI cards mounted on a motherboard 113 (FIG. 12A). The PCI card guides 662 provide alignment support to such cards so that the card may remain firmly connected into the appropriate connector on the motherboard. Further, the bottom half 665 of the bracket may also include built-in cable routers 663 to securely route fan cables as well as other electrical cables in the vicinity of the bracket. This arrangement reduces wiring clutter within the housing, and therefore effectively optimizes the limited housing space in a structured manner.

Turning now to FIG. 7A, a detailed three-dimensional view of the peripheral bay unit or the storage chamber 68 is shown. The storage chamber 68 may include a cover plate 70 and a peripheral bracket 72. The cover plate 70 may be attached to the peripheral bracket 72 by reforming extruded features in the peripheral bracket 72. Any other suitable method of attachment may also be used to fasten the cover plate 70 to the peripheral bracket 72. The peripheral bracket 72 may be used as a cradle to house one or more storage drives that may be inserted through various openings or peripheral bays in the cover plate 70. The peripheral bracket 72 and the cover plate 70 may preferably be of metal. However, other materials having sufficient strength to carry the weight of the storage drives may also be utilized to make the peripheral bracket and the cover plate.

Referring now to FIG. 7B, a peripheral assembly 78 with various filler plates or EMI (electromagnetic interference) shields—73, 74, 75, and 76—attached to the storage chamber 68 is shown at the right hand side of the figure. The left hand side of the figure shows a disassembled view of the fillers prior to being inserted or snapped into corresponding bays in the peripheral bay unit 68. The peripheral bay unit 68 may have one or more than one openings (or bays) to receive storage drives for storage media of different sizes. For example, the top bay in the peripheral bay unit 68 in FIG. 7B may receive a CD ROM drive, whereas the bottom bay may receive a floppy disk drive.

Besides the top and the bottom bays, a typical computer system housing generally provides two additional dedicated separate bays: one for a storage drive for a 5.25" storage medium (e.g., 5.25" floppy diskette, CD ROM, etc.), and the other for a storage drive for a 3.5" storage medium (e.g., 3.5" floppy diskette, data cartridge, etc.). The bay for the 5.25" storage drive may not house a 3.5" storage drive, and vice versa. Two separate bays may be unnecessary if a user, at some later point after purchasing the computer system, may never insert both of the storage drives. Additional openings may increase the size of the peripheral bay unit 68. In certain configurations of computer systems, it may be desirable to reduce the size of the peripheral bay unit 68. Therefore, the cover plate 70 for the peripheral assembly 78 in FIG. 7B is configured to have the central opening adaptable to receive either a 5.25" storage drive or a 3.5" storage drive. Thus, a single opening may be efficiently utilized for multiple drives depending on the user's choice.

The filler plate 73 may be utilized to enclose the top opening in the cover plate 70 until a corresponding storage drive, e.g., a CD ROM drive, is inserted therein. Similarly, the filler plate 76 may normally remain attached to or snapped into the bottom opening in the cover plate 70 until the insertion of, for example, a 3.5" floppy disk drive. The central bay, however, may be completely enclosed only when both of the filler plates, 74 and 75, are placed over it. The filler plate 74 remains normally detachably snapped into the central opening and partially encloses the central opening. On the other hand, the filler plate 75 is configured to remain normally detachably snapped into the filler plate 74, and not to the central opening in the cover plate 70. Both of the filler plates, 74 and 75, completely enclose the central bay when placed over it. The shapes for the filler plates 74 and 75 may be rectangular (as shown in FIG. 7B), curved or any other suitable shape so long as the appropriate drive (5.25" or 3.5") may be inserted as discussed below.

Insertion of either a 3.5" or a 5.25" storage drive into the central bay may be carried out by removing the appropriate filler plate. For example, when a user wants to insert a 3.5" storage drive into the central opening, the user may only need to remove the filler plate 75. The filler plate 74 remains attached to the central opening. On the other hand, when a user wishes to insert a 5.25" storage drive into the central bay, the user may need to remove the filler plate 74 from the central opening. As the filler plate 75 is attached to the filler plate 74, the removal of the filler plate 74 may, therefore, result in the removal of the filler plate 75 also. Thus, both of the filler plates, 74 and 75, may need be removed from the central opening when a 5.25" storage drive is to be inserted.

Preferably, the filler plates 73–76 are made of metal or metallic compound. The filler plates 74 and 75 may be the only plates that remain normally attached to the cover plate 70 when the housing 10 is ready for shipping. The remaining openings (i.e., the top and the bottom bays of the peripheral bay unit 68) may already contain corresponding storage drives at the time of shipping of the computer system. Further, the removable peripheral bezel 15 (FIG. 1B) with appropriate plastic cosmetic panels (similar in shape with the corresponding filler plate as shown in FIG. 8B) for the corresponding filler plates may be placed into the front bezel 20 to provide a cosmetic cover for peripheral bays in the cover plate 70 at the time of shipping of the computer system.

Each filler plate, 73–76, is configured to finction as an EMI shield when placed over the cover plate 70 to cover the corresponding peripheral bay. It is known that when the power is applied to various electronic components, the electronic components generate electromagnetic radiation. Any uncovered or unfilled opening in the cover plate 70 may result in the transmission of a significant portion of such electromagnetic radiation towards the user sitting adjacent to the computer housing 10. The filler plates may thus be designed to effectively contain such electromagnetic radiation from spreading out of the housing. Even when the housing 10 includes storage drives inserted in the top and the bottom openings in the cover plate 70, the filler plates (74 and 75) over the central opening may still prevent outward emission of electromagnetic radiation generated by various electronic components, including the storage drives residing in the top and the bottom bays of the peripheral bay unit 68.

Turning now to FIG. 8A, the internal and external views of a lighted power button assembly 80 mounted on a peripheral bezel 15 are shown. A user turns the computer system power on/off with the help of the power button 17 that is a part of the power button assembly 80. The peripheral bezel 15 may also include one or more plastic cosmetic panels 82–85 to cover corresponding openings in the cover plate 70 when respective peripheral storage drives are absent. As mentioned earlier, the cosmetic panels 82–85 may still be snapped into the peripheral bezel 15 (as illustrated in FIG. 8B) in the event that the openings in the cover plate 70 are covered by corresponding metal filler plates 73–76. The look of the front of the computer housing may be improved with matching appearances of the peripheral bezel 15, the cosmetic panels 82–85, and the front bezel 20 (FIG. 1B). FIG. 8B illustrates a disassembled view of the peripheral bezel 15 shown in FIG. 8A. The power button assembly 80 is shown to include two principal parts: the power button unit 86 and the light pipe 88.

Figure 9:
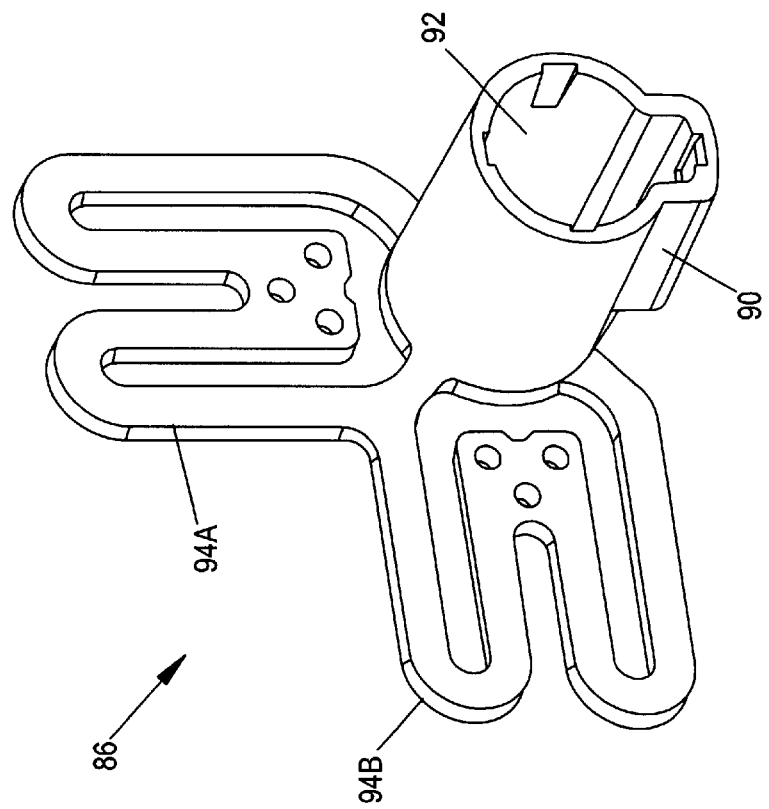
FIG. 9 shows a pair of three-dimensional views of part of the power button assembly shown in FIGS. 8A–8B.
Figure 9:
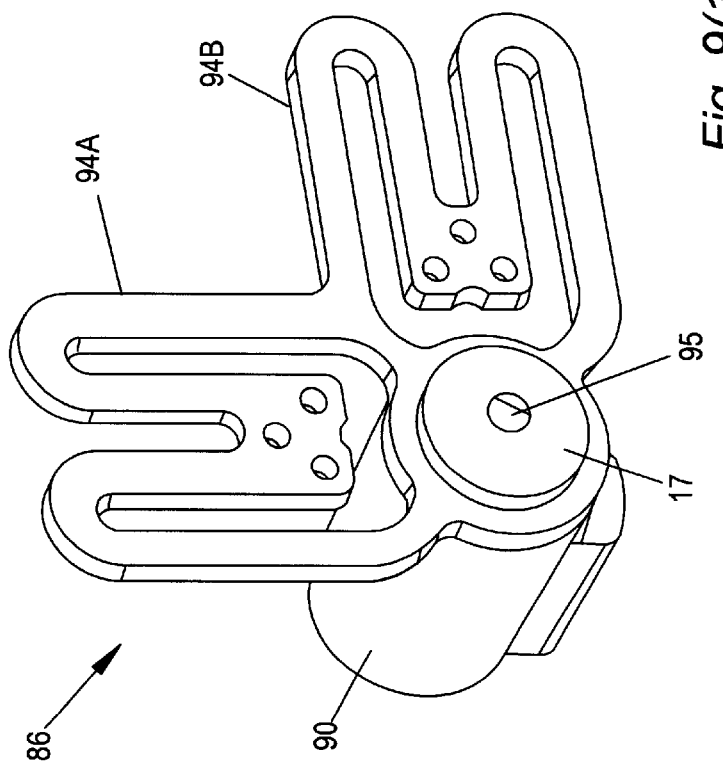

Referring now to FIG. 9, a pair of three-dimensional views of the power button unit 86 is shown. The power button unit 86 is mounted on the internal surface of the peripheral bezel 15 (FIG. 8A) with the help of horizontal 94B and vertical 94A wings. The length and structure of the wings 94 may allow the wings to flex in response to the inward push of the power button 17 by a user. The flexing of the wings may provide the motion needed to actuate the power button 17. The power button may return to its original position with the help of an attached spring as discussed later. The wings may be attached to the internal surface of the peripheral bezel with the help of screws, adhesive tapes, or any similar fasteners.

The power button unit 86 includes a stationary member 90 and a sliding member 92. The stationary member 90 remains immobile once the power button unit 86 is attached to the peripheral bezel. The sliding member 92, however, slides within the stationary member when a user pushes the power button 17. The power button 17 may be molded as part of the sliding member 92, which may be manufactured independently of the stationary member 90 and later inserted into the stationary member 90. Alternately, the power button may be manufactured independently and then snapped into the sliding member 92 before inserting the sliding member into the stationary member.

The power button unit 86 may be permanently mounted on the peripheral bezel 15. Therefore, removal of the peripheral bezel from the front bezel 20 may also remove the power button unit 86 away from the chassis, and, hence, may terminate the power on/off operations through the power button 17. However, the replacement of the peripheral bezel 15 back into the front bezel 20 allows the power button 17 to function effectively when the light pipe 88 is also inserted in the sliding member 92 as discussed below. Hence, the flexibility in removing the peripheral bezel 15 away from the chassis is not affected by the attachment of the power button assembly 80 thereto.

The sliding member 92 slides back and forth within the stationary member 90 with the help of an attached spring (not shown). The power button unit 86 includes an integral spring around the power button 17. One end of the spring is attached to the power button 17 itself, whereas the other end of the spring is attached to the internal surface of the peripheral bezel 15 to which the power button unit 86 is secured. In one embodiment, the spring is attached to the peripheral bezel via heatstakes.

Because of the presence of a spring, the power button 17 returns to its normal position (i.e., the position in which a maximum portion of the power button protrudes from the front of the peripheral bezel 15) after sliding away from the normal position to the extended position in response to a push from a user. When in the extended position, the power button (which is part of the sliding member 92) establishes, albeit for a short duration, an electrical contact with a power switch (not shown) mounted on the front wall of the chassis behind the power button assembly 80. The electrical contact with the power switch is established with the help of the light pipe 88 as discussed below. Once the electrical contact is established, the power button returns to its normal, front location because of the pulling force exerted by the spring. The user can therefore turn the computer system power on/off with the power button 17.

Figure 10:
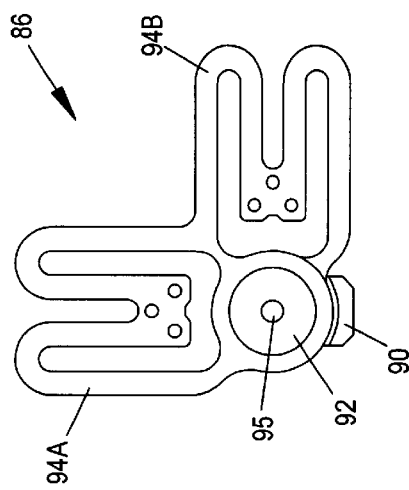
FIG. 10 depicts front elevations for the corresponding three-dimensional views in FIG. 9.
Figure 10:
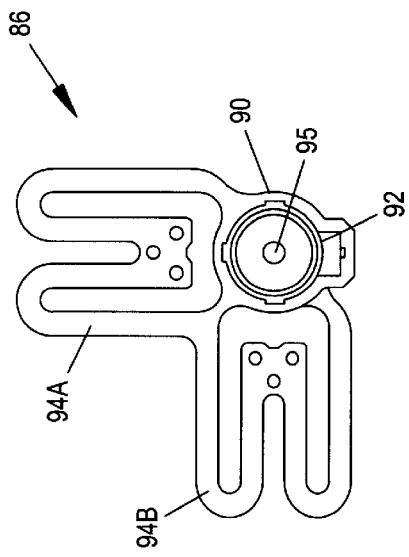

Turning now to FIG. 10, front elevations for the corresponding three-dimensional views of the power button unit 86 in FIG. 9 are shown. The left drawing in FIG. 10 corresponds to the left three-dimensional view in FIG. 9, and the right drawing in FIG. 10 corresponds to the right three-dimensional view in FIG. 9. The sliding member 92, the stationary member 90, and the light opening 95 are clearly illustrated.

Figure 11:
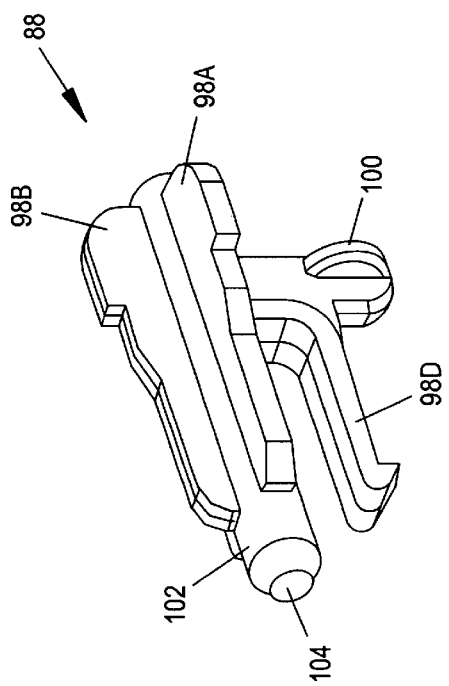
FIG. 11 illustrates different views of the light pipe forming part of the power button assembly shown in FIGS. 8A–8B.
Figure 11:
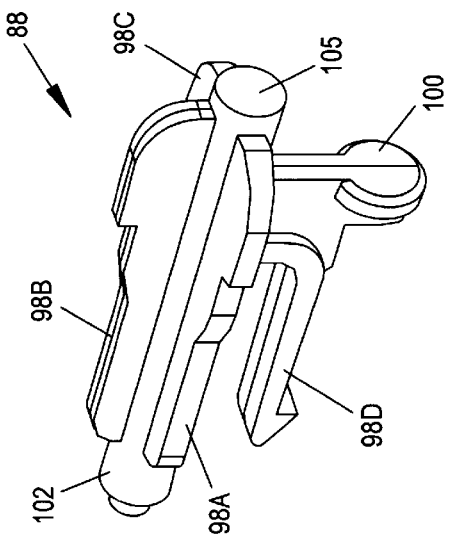

FIG. 11 illustrates in different views the light pipe 88 that forms part of the power button assembly shown in FIGS. 8A–8B. The light pipe 88 includes a hollow light tube 102 to which a number of support fins, 98A–98D, are attached. The support fins allow the light pipe 88 to be securely snapped into the sliding member 92 of the power button unit 86 as is illustrated in FIG. 8B. The source of light may be a simple LED (light emitting diode) mounted on the front wall of the chassis behind the power button assembly 80. For optimum light transmission, the light tube 102 is placed in straight line with the light source. The light emitted from the LED enters the rear end 105 of the light pipe 88 and exits from the front end 104 of the light pipe. When the light pipe is snapped into the sliding member 92, the front end of the light pipe is automatically positioned immediately behind the light opening 95 in the power button 17 (FIG. 9). Thus, optimum light transmission from the source of the light to the user is achieved.

The light pipe 88 also includes a striking rod 100 that may be a part of one or more of the support fins, e.g., support fins 98A, 98C and 98D in FIG. 11. The striking rod 100 momentarily establishes an electrical contact with the power switch circuitry (not shown) mounted on the chassis behind the power button assembly 80. A vertical extension that forms the striking rod 100 may be necessary when the actuation direction of the power button 17 is in line with the source of light. In other words, the power switch may not occupy the same place as the source of light. Therefore, the power switch may be placed above or below the source of light and adjacent to it on the front wall of the chassis behind the power button assembly 80. In the embodiment where the power switch is placed below the source of light, the striking rod 100 may be a downward vertical extension of one or more of the support fins. The opposite may be true where the power switch is placed above the source of light.

When a user pushes the power button 17, the sliding member 92 stretches toward the power switch (not shown) on the chassis. The light pipe 88 therefore also slides toward the power switch, and the striking rod 100 makes an electrical contact with the power switch before the sliding member (and, hence, the light pipe) slides away from the power switch because of the pull exerted by the integral spring in the power button unit 86. The striking rod 100 may be an independent appendage to the light tube 102, instead of a part of one or more fins as discussed before. With every push of the power button 17, the striking rod 100 strikes the power switch plunger (not shown), thereby turning on/off the system power as well as the light from the source of light.

The back and forth movement of the light pipe 88 does not affect the central alignment of the hollow light tube 102 with reference to the light opening 95. Thus, the light tube 102 stays in line with the light opening 95 once the light pipe 88 is snapped into the sliding member 92, irrespective of the back and forth movement of the sliding member 92 in response to the movement of the power button 17 by a user. The complete light pipe assembly, including the light tube and support fins, may be made of clear polycarbonate material. The power button unit 86, including the power button 17, may be manufactured with PC/ABS material.

Referring now to FIG. 12A, a disassembled view of the computer system housing 10 showing locations and placement of various system components is shown. The system power supply 118 may be separately placed on one side of the rear sub-chassis 50 (FIG. 5A) as discussed earlier. The right access panel 14A may then be attached to the chassis 12 to provide an aesthetic cover for the housing, and also to provide support during transportation of the housing 10. Similarly, the left access panel 14B and the top access panel 16 may be placed over the chassis 12 prior to shipping the housing 10. The access panels 14A, 14B and 16, may be made of plastic.

The front bezel 20 is shown attached to the chassis with the chassis cover 19A (not clearly visible) placed in-between. Appropriate filler plates 73–76 (FIG. 7B) may be removed from the peripheral assembly 78 while inserting corresponding peripheral storage drives. For example, the bottom filler plate 76 (FIG. 7B) may be removed to insert a 3.5" floppy disk drive 123, whereas the top filler plate 73 (FIG. 7B) may be removed to insert a CD ROM drive 124 or an empty casing for a CD ROM drive 119 (with the drive being inserted later). The peripheral storage drives and the peripheral assembly may be covered with the front bezel 20 and with the peripheral bezel 15. The power button 17 and the power button assembly 80 (not visible in FIG. 12A) may also be included as part of the peripheral bezel 15.

The hard drive cage 67 carrying one or more hard drives 114, and, preferably, some SCSI logic may be placed at the front of the chassis 12. The computer system shown in FIG. 12A may be a workstation or may simply be a regular personal computer (PC). The cooling fan bracket 66 is shown snapped into the chassis behind the hard drive cage 67 with two cooling fans 18A, 18B snapped into the bracket 66. One air guide 30 per cooling fan 18A, 18B may be snapped into the bracket 66 and in front of the respective fans with the mouth portion 34 (FIG. 3A) of each air guide directed toward the components to be cooled. An additional cooling fan 18C may be provided on the rear wall of the chassis 12 as is illustrated in FIG. 12A. The cooling of the entire system is discussed later with reference to FIG. 12B.

FIG. 12A also shows a motherboard 113 with a number of components that may be mounted on the motherboard either prior to or after the motherboard is securely mounted on the right wall of the chassis 12 created by the back portion 64 (FIG. 5B) of the rear sub-chassis 50. For example, one or more memory modules 122 may be inserted perpendicularly to the motherboard 113 via appropriate connectors on the motherboard 113. The memory modules 122 may be volatile or non-volatile, and may include one or more SIMM modules (Single In-line Memory Module). Various audio and video cards, e.g., the graphics card 110 and the audio module 116 may be inserted onto the motherboard for multimedia applications. As discussed before, any long PCI card, e.g., the graphics card 110, may get additional support and alignment through the PCI card guides 662 (FIG. 6C) provided on the bottom half 665 of the cooling fan bracket 66. A power converter 117 (e.g., from high voltage DC to low voltage DC) may reside on the motherboard for supplying the requisite power required by relatively low-power consuming circuit components on the motherboard 113.

A sheet metal stiffener (not visible in FIG. 12A) may provide a back plane support for the large sized motherboard 113. The stiffener may be at least of the size of the motherboard 113, and may rest between the motherboard 113 and the chassis wall on which the motherboard is mounted. This arrangement may provide better board to chassis grounding as well as better overall support for the motherboard during installation, maintenance and transportation of the motherboard or of the entire housing 10. The back plane support provided by the stiffener may reduce damage to the motherboard due to pressures exerted during component mounting, for example, when the motherboard is already installed on the chassis. Additionally, as a motherboard generally carries heavily dense electronic circuitry and components, a stiffener may facilitate easy mounting or removal of the motherboard from the chassis without damage to the motherboard's printed circuit paths or board material. The stiffener for the motherboard may thus provide the needed back plane support given the large size and heavy loading of the motherboard. Other circuit boards in the housing 10 may also have similar stiffeners between them and the corresponding chassis walls so as to provide secure and rigid back plane supports.

A shroud 111 that houses a number of central processing units (CPUs) or processors may also be mounted on the motherboard 113 in a way that maintains tight connections between the modules 112 carrying the processing units and the corresponding connectors on the motherboard 113 for each module in the set of modules 112. The shroud 111 may support more than one modules 112. For example, the shroud 111 in FIG. 12A supports up to four CPU modules 112. The shroud 111 in FIG. 12A is constituted of four plastic parts that are heatstaked together to form the shroud frame. Further, each plastic part constituting the shroud 111 includes pertinent features that facilitate mounting of the shroud 111 onto the motherboard as well as mounting and support of airblocks 115, riser card 120 and the air guide 30 as discussed below.

Figure 12B:
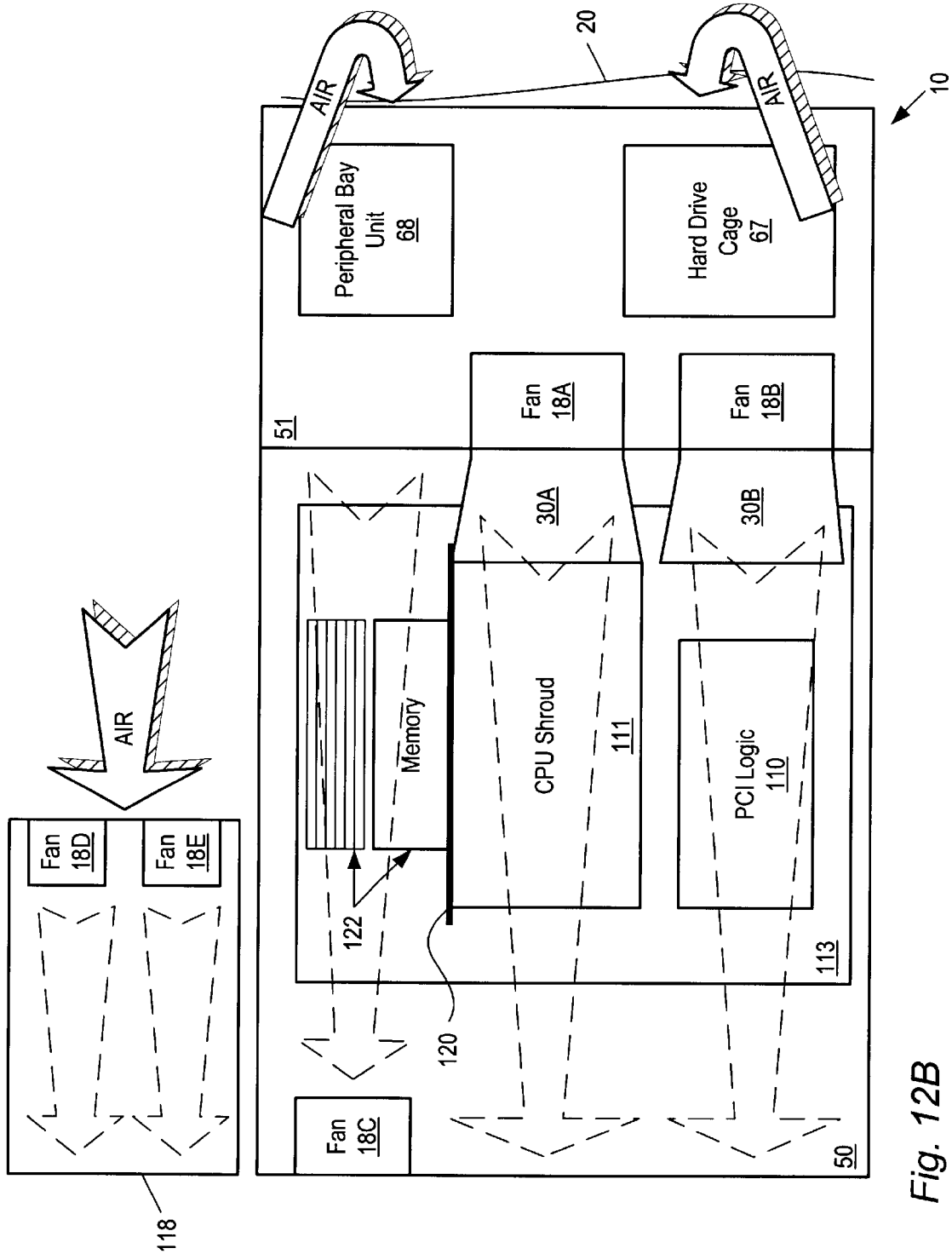
FIG. 12B shows a simplified block schematic for the air cooling of the housing in FIG. 12A.

As mentioned earlier, the air guide 30 may be mounted on the cooling fan 18A to provide channeling of the cooling air towards CPU modules 112. The air guide thus prevents the air coming out of the fan 18A to be wasted in other channels within the housing 10. The neck portion 32 (FIG. 3A) of the air guide 30 snaps into the fan bracket 66 and in front of the fan 18A. However, the mouth portion 34 (FIG. 3A) of the air guide 30 may be configured to snap into the corresponding features provided along the right hand side (i.e., the side adjacent to the mouth portion of the air guide) of the shroud 111 without requiring any tools or fixtures. This arrangement supports the air guide 30 and maintains it in its place and in very close proximity with the CPU modules 112 even during transportation or shifting of the housing 10. Further, the air guide, when mounted in such a manner, balances the airflow across all of the four modules 112 so that all modules are cooled equally. In other words, a dedicated air channel is maintained from the cooling fan 18A to all of the CPU modules 112. A schematic representation of such an arrangement is shown in FIG. 12B.

In the event that the number of modules 112 loaded with CPUs is less than what the shroud 111 can accommodate, an airblock 115 may be inserted into the appropriate empty slot within the shroud 111 to prevent cooling air (coming out of the mouth of the air guide 30) from being shunted in the empty slot. Thus, for example, when three of the four modules 112 in FIG. 12A contain processors and the fourth module has no processor loaded therein, then an airblock 115 may be inserted into the shroud 111 in place of the fourth module so as to prevent wastage of cooling air. Each airblock 115 has front and right hand side edges (i.e., the edge that faces the mouth portion of the air guide 30) raised so that cooling air from the air guide 30 may not enter into the slot in the shroud 111 containing the airblock. However, each airblock 115 has a central opening that allows vertical airflow within the shroud. Further, due to the absence of a raised edge at the left side (i.e., the side facing the rear of the chassis) of an airblock 115, an exit passage for the cooling air is not blocked. This maintains continuous air circulation within the housing 10.

One way to optimize the density of components packed within the housing 10 may be to use a riser card 120. The riser card 120 carries additional memory modules 122 to expand the memory capacity of the motherboard 113. FIG. 12A shows the memory modules mounted on the riser card 120 to be of the same type as those directly mounted on the motherboard 113. However, in one embodiment, the two modules may be of different types. The riser card 120 is mounted in perpendicular to the plane containing the motherboard 113. Additional memory slots are provided on the riser card 120 to accommodate memory modules 122. After the CPU shroud 111 has been mounted on the motherboard 113, the riser card 120 may be inserted on top of the shroud 111 through the guide features (not visible) provided on the top of the shroud 111. These guide features provide proper alignment of the riser card dual-in-line mating connectors with the corresponding slots on the motherboard 113.

The riser card 120 may also include two torque-limiting screws 121 supported through screw mount brackets securely placed on the corresponding edges of the riser card. The riser card 120 may be screwed on top of the shroud 111 with the help of the torque-limiting screws. The torque-limiting screws 121 allow the riser card 120 to be secured on top of the shroud 111 and also into the appropriate slots on the motherboard 113 without any damage to its conducting edges. The torque-limiting screws 121 may prevent "over tightening" of the riser card 120 into the connecting slots on the motherboard 113 by limiting the tightening of the screws 121 beyond a predetermined torque limit. Any additional torque applied by the person mounting the riser card may result in the "slipping" of the corresponding torque-limiting screw 121. In other words, additional torque may simply rotate the head of the corresponding torque-limiting screw 121, but no spiral movement of the threads of the torque-limiting screw may occur (i.e., further tightening of the screw 121 may be prevented). Due to the torque-limiting screws 121 and due to the guide features (for proper alignment of the riser card 120 connectors with the corresponding slots on the motherboard 113) on the shroud 111, the riser card 120 fits snugly into corresponding slots on the motherboard 113.

FIG. 12A illustrates a situation where due to the specific alignment and placement of slots on the motherboard 113, a vertical space is created between the top of the shroud 111 and the memory module 122 that can be inserted nearest to the shroud 111 on the motherboard 113. In the absence of the riser card 120, this vertical space may get wasted. Further, no additional cooling is required to channel cooling air through this vertical space because that vertical space may already fall under a cooling channel created by the fan 18C as is explained later in view of FIG. 12B. Therefore, it is desirable to fill the vertical space above the shroud 111 so as to optimize the density of components on the motherboard 113 and also within the housing 10.

As can be seen from FIG. 12A, the riser card 120 is mounted on the shroud 111 beneath the stack of the memory modules 122 (which are directly mounted on the motherboard 113) and in parallel to the motherboard memory modules. Whereas, the memory modules inserted on the riser card 120 remain vertical and perpendicular to the memory modules directly mounted on the motherboard 113.

Therefore, additional memory is provided in a space saving, vertical and modular fashion through the riser card arrangement. The modular form factor of the riser card 120 and the securing of the riser card 120 with the help of the torque-limiting screws 121 provide independent insertion/removal (from the shroud 111 and the motherboard 113) of the riser card 120 for servicing.

Turning now to FIG. 12B, a simplified block schematic for the air cooling of the housing in FIG. 12A is illustrated. The top schematic shows cooling arrangement for the power supply unit 118, whereas the bottom schematic shows cooling arrangement for other components within the housing 10 excluding the system power supply 118. The power supply 118 may provide up to 600 watts to the system, and may itself dissipate about 300–400 watts. Therefore, a total of 1000 watts of power may be dissipated within the housing 10. The power supplied to the system may be consumed by a number of system components. For example, the system may include: two full high hard drives 114 in the hard drive cage 67 in front of the chassis; a motherboard 113 with up to four CPU plug-in modules 112, up to two UPA (Ultra Port Architecture) high-bandwidth graphics cards and other additional PCI cards, fully stacked memory modules (both on the motherboard and on the riser card 120); up to three removable peripheral drives in the peripheral assembly 78 (with appropriate filler plates 73–76 removed), etc. The heat generated within the system may be significant in view of the large amount of power consumed and in view of the dense packing of a large number of electronic components within the limited housing space.

The cooling of the entire computer system may be managed by five fans as shown in FIG. 12B. The cooling fans 18D and 18E may draw the ambient air surrounding the front of the power supply 118 through vents in right access panel 14A. In one embodiment, some or all of the channel ends 46 (FIGS. 4A, 4B) in the right access panel 14A constitute vents along the front side of the indented portion (i.e., the portion that covers the power supply unit 118). These vents allow the ambient air to enter into the system power supply 118 through the drawing force exerted by the cooling fans 18D and 18E. The drawn air, once inside the power supply unit 118, is pushed (by the rotating fans 18D and 18E) past the various components in the system power supply 118 before it exits through the vents provided on the rear end of the system power supply 118. Two air channels (as illustrated in FIG. 12B) may be created within the power supply 118 covering the entire power supply interior during cooling. Thus, the cooling of system power supply 118 is managed independently of the cooling of the remainder of the computer system as is illustrated through FIGS. 12A and 12B. Each of the cooling fans 18D and 18E may be an 80mm standard fan or it may have a Japan Servo configuration.

The cooling arrangement for the motherboard, the hard drives, the CPUs, the memory modules, the peripheral drives, etc. is shown in the bottom schematic in FIG. 12B. Three cooling fans may be employed to maintain appropriate cooling channels (illustrated by dotted arrows in FIG. 12B) within the housing 10. The sideways air inlets 11 (FIG. 1A) created by the curved bezel 20 allow ambient air in front of the housing to be drawn into the housing with the help of the cooling fans 18A–18C.

The cooling fan 18B draws air from the front sub-chassis 51 (through the sideways air inlets 11) past the hard drive cage 67 (thus cooling the hard drives within the cage 67), and pushes the air over one or more PCI cards 110 mounted on the motherboard 113 before forcing the air out of the vents in the rear sub-chassis 50. An air guide 30B may be mounted in front of the cooling fan 18B and in close proximity to the PCI cards 110 so as to effectively channel the air flow over the PCI logic portion of the motherboard 113. The cooling fan 18B may be a 120 mm standard fan or it may have a Japan Servo configuration as mentioned earlier.

The cooling fan 18A similarly draws air from the front sub-chassis 51 (through the sideways air inlets 11) past the hard drive cage 67 (thus cooling the hard drives in the process), and pushes the air through the CPU shroud 111 mounted on the motherboard 113 before forcing the air out of the vents in the rear sub-chassis 50. As discussed earlier, an air guide 30A may be mounted in front of the cooling fan 18A (on the fan bracket 66, FIG. 12A) and the mouth portion of the air guide 30A may be snapped into the right-hand side (i.e., the side nearest to the mouth portion of the air guide 30A) of the shroud 111. The top edge of the mouth portion of the air guide 30A rests just below the bottom of the riser card 120. The extremely close proximity of the air guide 30A to the shroud 111 maintains a consistent cooling environment for the crucial elements of the computer system, i.e., the processors. The airflow channel over the modules 112 (FIG. 12A) carrying processors remains heavy and concentrated around the shroud area, resulting in a dedicated cooling environment for the processors. The cooling fan 18A may also be a 120 mm standard fan or it may have a Japan Servo configuration.

The placement of the cooling fans 18A and 18B at the junction of the front and the rear sub-chassis allows for a creation of dedicated channels of cooling air extending lengthwise along a substantial portion of the interior of the housing 10 as the dotted arrows in FIG. 12B illustrate. Furthermore, the removal of the relatively larger cooling fans 18A, 18B from the immediate vicinity of the front wall 13 (FIG. 1B) of the chassis 12 reduces outward emissions of noise generated by these fans. Thus, the exposure of a large portion of the front wall 13 of the chassis 12 (through the curved bezel 20) to the surrounding air is balanced by the moving back of the fans 18A, 18B towards the interior of the housing so as to maintain low noise emissions. The sideways air inlets 11 also allow for more ambient airflow into the housing, reducing the cooling burden on the fans 18A–18C.

The fifth cooling fan 18C may be attached to the top (FIG. 12A) of the back side (internal) of the rear sub-chassis 50. This fan may be of smaller size than the centrally mounted fans 18A, 18B. In one embodiment, the cooling fan 18C is an 80 mm standard fan or has a Japan Servo configuration. The cooling fan 18C draws air from the front sub-chassis 51 (through the sideways air inlets 11) past the peripheral bay unit 68 (thus cooling any peripheral drives present in the peripheral bay unit), through the memory modules 122 (including both: those mounted directly on the motherboard 113 as well as those mounted on the riser card 120) and through the power converter 117 (FIG. 12A) before forcing the air out of the vents in the rear sub-chassis 50.

The foregoing discloses a computer housing configuration where a curved front bezel allows for creation of sideways air gaps along the front wall of the chassis, resulting in ambient air flow into the housing through a larger surface area on the front wall of the chassis. The placement of cooling fans and air guides as well as the sideways air flow configuration provide adequate and efficient component cooling without undue multiplicity of cooling fans and without sacrificing component packing density within the housing. Furthermore, the compartmentalized chassis structure allows flexibility in chassis reconfiguration without compromising system cooling efficiency.

While the invention is susceptible of various modifications and alternative forms, specific embodiments thereof are shown by way of examples in the drawings and are herein described in detail. It should be understood, however, that the drawings and detailed description thereto are not intended to limit the invention to the particular forms disclosed, but on the contrary, the intention is to cover all such modifications, equivalents and alternatives as may fall within the spirit and scope of the present invention as defined by the appended claims.

What is claimed is:

1. A computer system housing comprising:
   a chassis;
   a first circuit board mounted on a wall of said chassis, wherein said first circuit board comprises:
      one or more first sockets mounted on said first circuit board,
      one or more first memory cards, wherein each of said one or more first memory cards is inserted into a corresponding one of said one or more first sockets, wherein upon insertion said each of said one or more first memory cards is oriented substantially perpendicularly to said first circuit board, and
      a second socket mounted on said first circuit board and in parallel to said one or more first sockets; and
   a second circuit board inserted into said second socket and in parallel to said one or more first memory cards, wherein said second circuit board comprises:
      one or more third sockets mounted on said second circuit board, and
      one or more second memory cards, wherein each of said one or more second memory cards is inserted into a corresponding one of said one or more third sockets, and wherein upon insertion said each of said one or more second memory cards is oriented substantially perpendicularly to said second circuit board and remains in a vertical space between said second circuit board and one of said one or more first memory cards that is inserted nearest to said second circuit board on said first circuit board.

2. The computer system housing as in claim 1, further comprising:
   a shroud mounted on said first circuit board, wherein the top of said shroud is aligned to said second socket, and wherein said second circuit board is screwed on the top of said shroud as part of insertion thereof into said second socket.

3. The computer system housing as in claim 2, wherein said first circuit board is a computer system motherboard.

4. The computer system housing according to claim 3, wherein said motherboard comprises one or more fourth sockets mounted thereon, said computer system housing further comprising:
   one or more processor modules housed within said shroud, wherein each of said one or more processor modules is inserted into a corresponding one of said one or more fourth sockets.

5. The computer system housing of claim 3, further comprising:
   a support frame positioned between said motherboard and said wall of said chassis, wherein said support frame is mounted on said wall of said chassis and said motherboard is mounted on said support frame, and wherein said support frame is of substantially the same size a said motherboard.

6. The computer system housing according to claim 5, wherein said support frame is constructed of sheet metal.

7. The computer system housing as in claim 3, wherein said chassis comprises:
   a front sub-chassis formed of a first plurality of walls; and
   a rear sub-chassis formed of a second plurality of walls, wherein said wall of said chassis is a first one of said second plurality of walls, wherein said rear sub-chassis is fastened to said front sub-chassis, and wherein a second one of said second plurality of walls partitions said front and said rear sub-chassis when said rear sub-chassis is fastened to said front sub-chassis.

8. The computer system housing of claim 7, further comprising:
   one or more cooling fans, wherein said second one of said second plurality of walls includes one or more windows therein, and wherein each of said one or more cooling fans is housed within a corresponding one of said one or more windows.

9. A computer system housing comprising:
   a chassis;
   a first circuit board coupled to the chassis;
   a first socket mounted on the first circuit board;
   a first card removably coupled to the first socket in a substantially perpendicular orientation relative to the first circuit board;
   a second socket mounted on the circuit board;
   a second circuit board removably coupled to the second socket in a substantially perpendicular orientation relative to the first circuit board;
   a third socket mounted on the second circuit board;
   a second card removably coupled to the third socket in a substantially perpendicular orientation relative to the second circuit board and in a substantially parallel orientation relative to the first circuit board.

10. The computer system housing of claim 9, wherein a portion of the second card extends over a portion of the first card.

11. The computer system housing of claim 9, wherein the first card comprises a memory card.

12. The computer system housing of claim 9, wherein the first card comprises a memory card.

13. The computer system housing of claim 9, further comprising a shroud mounted on the motherboard adjacent to the second socket, wherein a fastener mounts the circuit board to the shroud.

14. The computer system housing of claim 9, wherein the fastener comprises a torque-limiting screw.

15. The computer system housing of claim 13, further comprising a processor module coupled to the motherboard within the shroud.

16. A computer comprising:
   a chassis;
   a computer system motherboard coupled to the chassis;
   a first socket mounted on the motherboard;
   a first card removably coupled to the first socket in a substantially perpendicular orientation relative to the motherboard;
   a second socket mounted on the motherboard;
   a circuit board removably coupled to the second socket in a substantially perpendicular orientation relative to the motherboard;
   a third socket mounted on the circuit board;
   a second card removably coupled to the third socket in a substantially perpendicular orientation relative to the circuit board and in a substantially parallel orientation relative to the motherboard.

17. The computer of claim 16, wherein the first card comprises a memory card.

18. The computer of claim 16, wherein the second card comprises a memory card.

19. The computer of claim 16, further comprising a processor coupled to the motherboard.

20. The computer of claim 19, further comprising a shroud mounted to the motherboard, and wherein the circuit board mounts by a fastener to the shroud.

* * * * *

UNITED STATES PATENT AND TRADEMARK OFFICE
CERTIFICATE OF CORRECTION

PATENT NO.    : 6,272,007 B1
DATED         : August 7, 2001
INVENTOR(S)   : Kitlas et al.

It is certified that error appears in the above-identified patent and that said Letters Patent is hereby corrected as shown below:

<u>Title page,</u>
Item [75], please delete "Winiie C. Leung" and substitute therefor
-- Winnie C. Leung --.

Signed and Sealed this

Twenty-third Day of July, 2002

Attest:

Attesting Officer

JAMES E. ROGAN
*Director of the United States Patent and Trademark Office*